US009504045B2

(12) United States Patent
Lo et al.

(10) Patent No.: US 9,504,045 B2
(45) Date of Patent: Nov. 22, 2016

(54) BLUETOOTH SERVICE ESTIMATION APPARATUS AND BLUETOOTH SERVICE ESTIMATION METHOD THEREOF

(71) Applicant: REALTEK SEMICONDUCTOR CORPORATION, Hsinchu (TW)

(72) Inventors: Chen-Hsing Lo, Taoyuan County (TW); Chia Chun Hung, New Taipei (TW); Yi-Cheng Chen, Taoyuan County (TW); Yi-Lin Li, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 166 days.

(21) Appl. No.: 13/941,150

(22) Filed: Jul. 12, 2013

(65) Prior Publication Data

US 2014/0016585 A1 Jan. 16, 2014

(30) Foreign Application Priority Data

Jul. 13, 2012 (TW) .............................. 101125418 A
May 24, 2013 (TW) .............................. 102118324 A

(51) Int. Cl.
*H04W 72/04* (2009.01)
*H04W 72/12* (2009.01)
*H04W 88/06* (2009.01)

(52) U.S. Cl.
CPC ..... *H04W 72/0486* (2013.01); *H04W 72/1215* (2013.01); *H04W 88/06* (2013.01)

(58) Field of Classification Search
None
See application file for complete search history.

(56) References Cited

U.S. PATENT DOCUMENTS

| 7,218,644 | B1* | 5/2007 | Heinonen et al. ............ 370/468 |
| 7,643,463 | B1* | 1/2010 | Linsky et al. ................ 370/344 |
| 2002/0082060 | A1* | 6/2002 | Kang et al. ................... 455/574 |
| 2002/0193073 | A1* | 12/2002 | Fujioka ........................... 455/41 |
| 2003/0058830 | A1* | 3/2003 | Schmidt ......................... 370/347 |
| 2004/0264433 | A1* | 12/2004 | Melpignano .................. 370/349 |

(Continued)

OTHER PUBLICATIONS

Bluetooth Special Interest Group, Bluetooth Baseband, https://www.bluetooth.org/Technical/AssignedNumbers/baseband.htm, Feb. 7, 2009.*

(Continued)

*Primary Examiner* — Faruk Hamza
*Assistant Examiner* — Cassandra Decker
(74) *Attorney, Agent, or Firm* — Tim Tingkang Xia, Esq.; Locke Lord LLP

(57) ABSTRACT

A Bluetooth service estimation apparatus and a Bluetooth service estimation method thereof are provided. The Bluetooth service estimation apparatus listens to data packets transmitted between the Bluetooth host and the remote Bluetooth device, and determines a Bluetooth service type between the Bluetooth host and the remote Bluetooth device according to contents of the data packets. The Bluetooth service estimation apparatus transmits the Bluetooth service type to a packet traffic arbitration module of a Wi-Fi host so that the Wi-Fi host determines a weight of network resources according to the Bluetooth service type, and decides a utilization rate of an antenna based on the weight of the network resources.

20 Claims, 19 Drawing Sheets

(56) References Cited

U.S. PATENT DOCUMENTS

| | | | | |
|---|---|---|---|---|
| 2005/0135406 | A1* | 6/2005 | Fleming | H04L 69/03 370/444 |
| 2006/0030265 | A1* | 2/2006 | Desai | H04W 72/1215 455/41.2 |
| 2008/0287063 | A1* | 11/2008 | Kidron et al. | 455/41.2 |
| 2009/0137206 | A1* | 5/2009 | Sherman | H04W 16/14 455/41.2 |
| 2009/0305634 | A1* | 12/2009 | Nguyen | 455/41.2 |
| 2009/0312010 | A1* | 12/2009 | Hall | 455/426.1 |
| 2011/0268051 | A1* | 11/2011 | Tsao | H04W 74/006 370/329 |

OTHER PUBLICATIONS

Bluetooth Audio Video Working Group, Advanced Audio Distribution Profile Specification, Adopted version 1.0, May 22, 2003 pp. 38, 39, 50-53.*

Information and Communications University, Bluetooth Packets: Special topics on ad hoc and sensor networks, http://mmlab.kaist.ac.kr/menu2/popup/ICE839/Bluetooth-2.pdf, Oct. 4, 2009.*

* cited by examiner

BLUETOOTH SERVICE ESTIMATION APPARATUS AND BLUETOOTH SERVICE ESTIMATION METHOD THEREOF

This application claims priorities to Taiwan Patent Application No. 101125418 filed on Jul. 13, 2012 and Taiwan Patent Application No. 102118324 filed on May 24, 2013.

CROSS-REFERENCES TO RELATED APPLICATIONS

Not applicable.

BACKGROUND OF THE INVENTION

1. Field of the Invention

The present invention relates to a Bluetooth service estimation apparatus and a Bluetooth service estimation method thereof. More particularly, the Bluetooth service estimation apparatus and the Bluetooth service estimation method thereof of the present invention determine a Bluetooth service type directly according to contents of a data packet and data transmission behaviors.

2. Descriptions of the Related Art

Bluetooth wireless communication is one of applications of the short-range wireless communication technology. The communication frequency range used for the Bluetooth wireless communication technology is close to that used for the Wi-Fi wireless network communication technology. Therefore, when an electronic device using the Bluetooth wireless communication technology also has the Wi-Fi wireless network communication function, the electronic device usually needs to have a packet traffic arbitration mechanism in order to avoid data transmission errors caused by interference. The packet traffic arbitration mechanism allocates and coordinates use of network resources (e.g., antennae) in accordance with transmission statuses provided by a Bluetooth communication module and a Wi-Fi communication module respectively so as to improve the overall network utilization efficiency of the electronic device.

When the electronic device and a Bluetooth apparatus are used in pair and transmit data to each other, the electronic device must use an additionally transmitted control instruction to determine a service type used between the electronic device and the Bluetooth apparatus because no message definitely defining the service contents is carried in the data transmitted therebetween. Only in this way, can the packet traffic arbitration mechanism of the electronic device decide the priority level of the Bluetooth communication module in using the network resources according to different Bluetooth service types.

However, the contents of the service control instruction are not definitely specified in the Bluetooth communication protocol, so different manufacturers can define the contents of the service control instruction by themselves. Therefore, the electronic device must have the capability of analyzing the control instruction formats of the different manufacturers in order to carry out data transmission with the Bluetooth apparatuses of the different manufacturers. Thus, the electronic device has limitations in use.

SUMMARY OF THE INVENTION

The present invention provides a Bluetooth service estimation method for a Bluetooth service estimation apparatus. The Bluetooth service estimation apparatus is disposed in a Bluetooth controller, and is electrically connected with a packet traffic arbitration module of a Wi-Fi host and a Bluetooth host. The Bluetooth service estimation method comprises the following steps: (a) enabling the Bluetooth service estimation apparatus to detect at least one data packet transmitted between the Bluetooth host and a remote Bluetooth device; (b) enabling the Bluetooth service estimation apparatus to determine a Bluetooth service type between the Bluetooth host and the remote Bluetooth device according to contents of the at least one data packet; and (c) enabling the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

The present invention also provides a Bluetooth service estimation apparatus. The Bluetooth service estimation apparatus is disposed in a Bluetooth controller and electrically connected with a packet traffic arbitration module of a Wi-Fi host and a Bluetooth host. The Bluetooth service estimation apparatus comprises a transceiver and a service estimation module. The transceiver is configured to detect at least one data packet transmitted between the Bluetooth host and a remote Bluetooth device. The service estimation module is configured to determine a Bluetooth service type between the Bluetooth host and the remote Bluetooth device according to contents of the at least one data packet. The transceiver is further configured to transmit the Bluetooth service type to the packet traffic arbitration module so that the packet traffic arbitration module determines a weight of network resources according to the Bluetooth service type and decides a utilization rate of an antenna according to the weight of the network resources.

With the technical features disclosed above, the Bluetooth service estimation apparatus and the Bluetooth service estimation method of the present invention can analyze behaviors and contents of a general data packet to determine the Bluetooth service type on that the packet traffic arbitration module and the Wi-Fi host perform subsequent operations and determinations.

The detailed technology and preferred embodiments implemented for the subject invention are described in the following paragraphs accompanying the appended drawings for people skilled in this field to well appreciate the features of the claimed invention.

DESCRIPTION THE PREFERRED EMBODIMENT

Figure 1A:
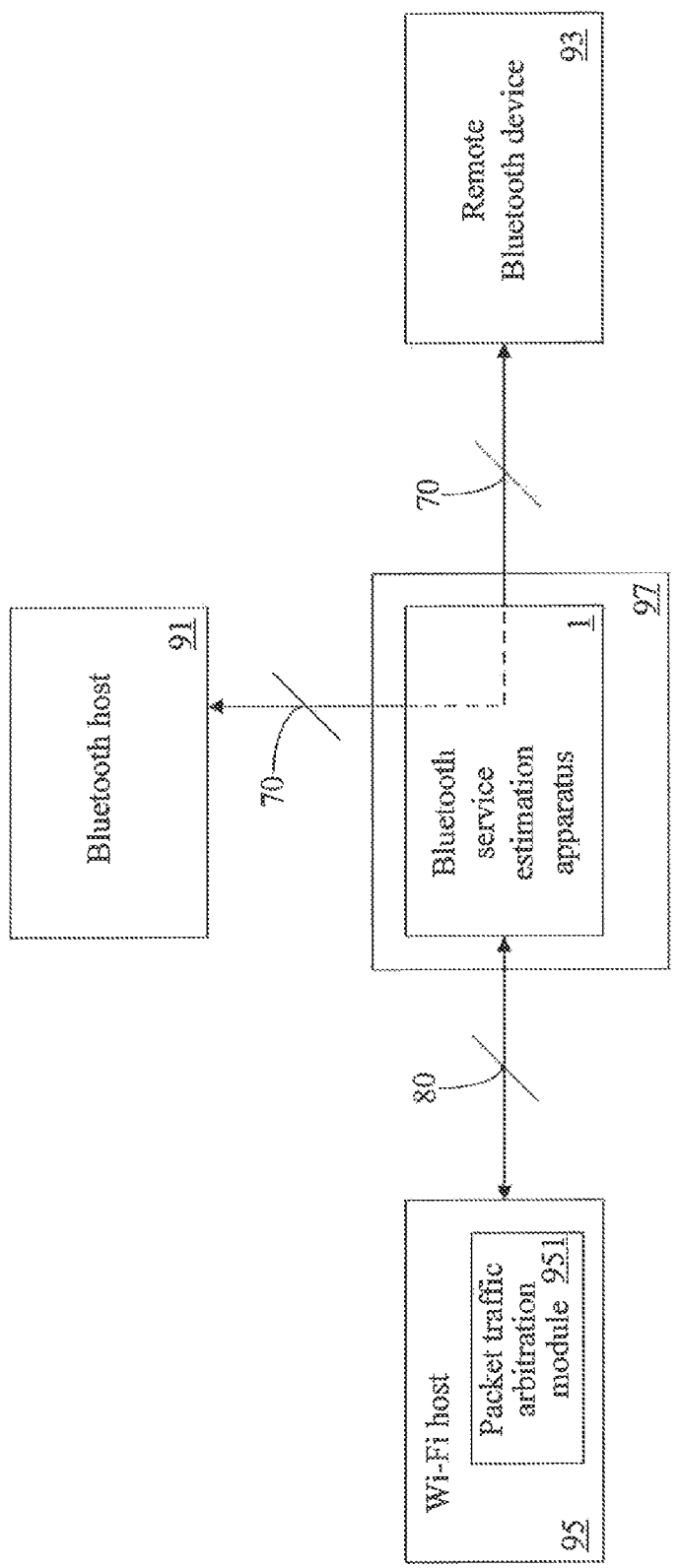
FIG. 1A is a schematic view illustrating connection relationships for a Bluetooth service estimation apparatus according to a first embodiment of the present invention.
Figure 1B:
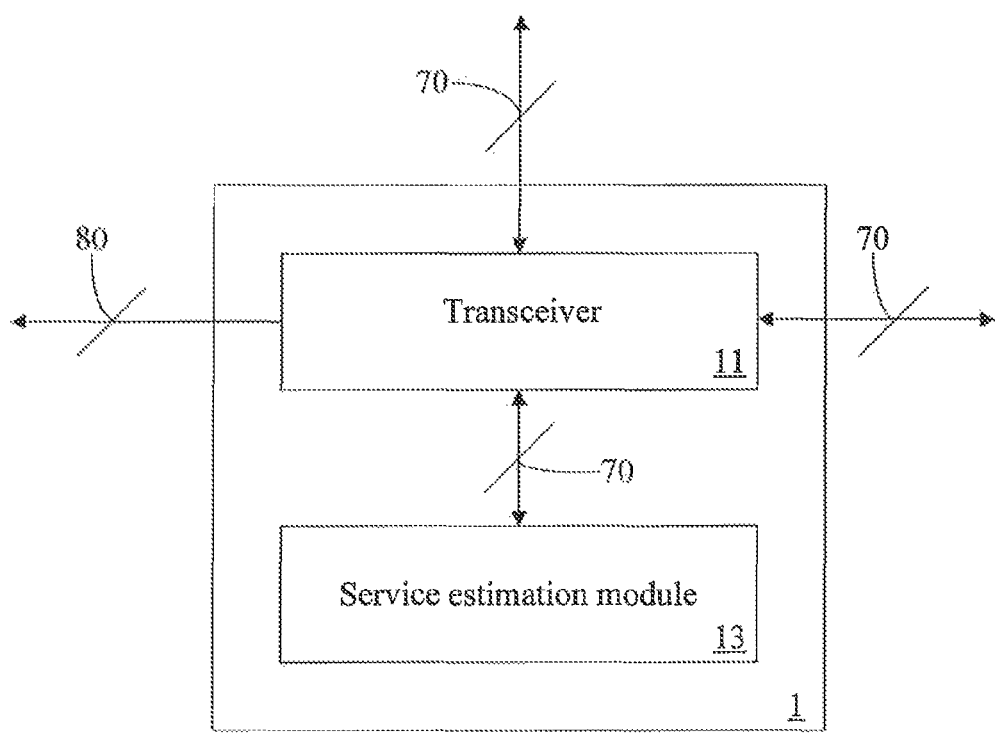
FIG. 1B is a schematic view illustrating the Bluetooth service estimation apparatus according to the first embodiment of the present invention.

Refer to FIG. 1A to FIG. 1B together. FIG. 1A is a schematic view illustrating connection relationships for a Bluetooth service estimation apparatus 1 according to a first embodiment of the present invention; and FIG. 19 is a schematic view illustrating the Bluetooth service estimation apparatus 1 according to the first embodiment of the present invention. The Bluetooth service estimation apparatus 1 comprises a transceiver 11 and a service estimation module 13. The Bluetooth service estimation apparatus 1 is disposed in a Bluetooth controller 97, and is electrically connected with a packet traffic arbitration module 951 of a Wi-Fi host 95 and a Bluetooth host 91. Interactions between the components will be further elucidated in the following description.

Firstly, the Bluetooth host 91 has a connection with a remote Bluetooth device 93; and the Bluetooth service estimation apparatus 1 disposed in the Bluetooth controller 97 is configured to listen to information, which is transmitted between the Bluetooth host 91 and the remote Bluetooth device 93 through the connection. Specifically, data transmission between the Bluetooth host 91 and the remote Bluetooth device 93 is carried out through the Bluetooth controller 97, so the transceiver 11 of the Bluetooth service estimation apparatus 1 can be used to listen to at least one data packet 70 transmitted between the Bluetooth host 91 and the remote Bluetooth device 93. Then, the service estimation module 13 can determine a Bluetooth service type 80 between the Bluetooth host 91 and the remote Bluetooth device 93 according to the at least one data packet 70.

Then, the transceiver 11 transmits the Bluetooth service type 80 to the packet traffic arbitration module 951 of the Wi-Fi host 95 so that the packet traffic arbitration module 951 determines a weight of network resources according to the Bluetooth service type 80 and decides a utilization rate of an antenna according to the weight of the network resources. Further speaking, different Bluetooth service types have different data transmission contents or transmission behaviors, so the service estimation module can determine the corresponding Bluetooth service type according to the data transmission contents or the transmission behaviors. Further, different Bluetooth service types have different priority levels of using network resources, so the packet traffic arbitration module can determine a proportion of the network resources (e.g., the antenna) occupied by the Bluetooth data transmission according to different Bluetooth service types.

Figure 2A:
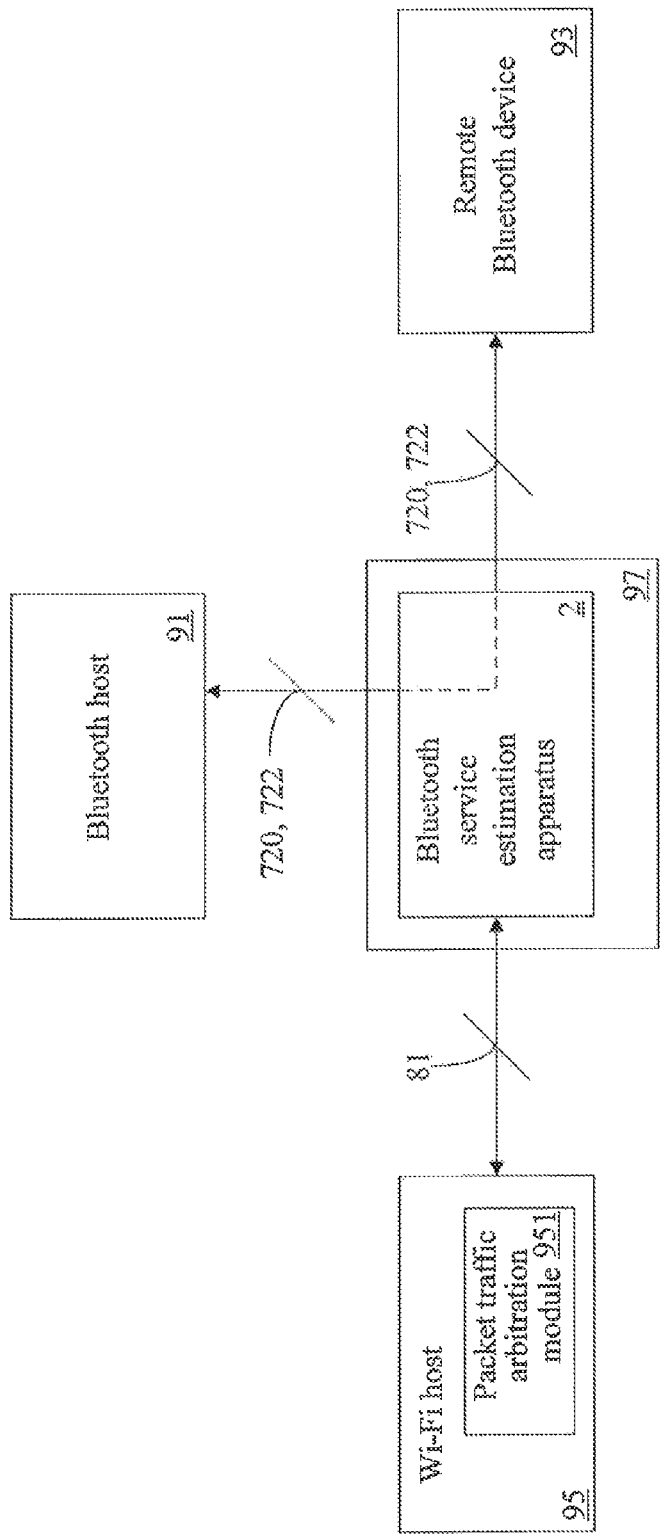
FIG. 2A is a schematic view illustrating connection relationships for a Bluetooth service estimation apparatus according to a second embodiment of the present invention.
Figure 2B:
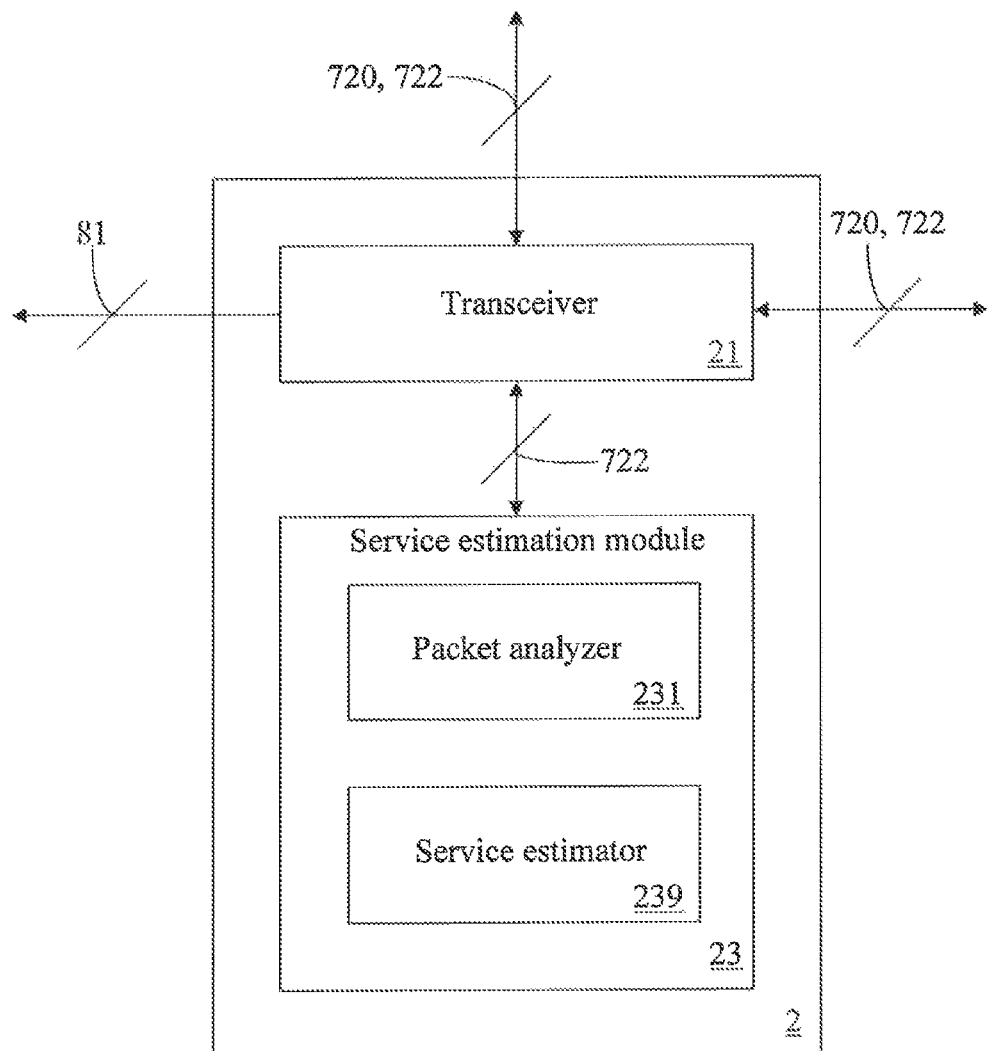
FIG. 2B is a schematic view illustrating the Bluetooth service estimation apparatus according to the second embodiment of the present invention.

Next, processes and ways of determining various service types will be further described. Refer to FIG. 2A to FIG. 2B. FIG. 2A is a schematic view illustrating connection relationships for a Bluetooth service estimation apparatus 2 according to a second embodiment of the present invention; and FIG. 2B is a schematic view illustrating the Bluetooth service estimation apparatus 2 according to the second embodiment of the present invention. The Bluetooth service estimation apparatus 2 comprises a transceiver 21 and a service estimation module 23. The Bluetooth service estimation apparatus 2 is disposed in a Bluetooth controller 97, and is electrically connected with a packet traffic arbitration module 951 of a Wi-Fi host 95 and a Bluetooth host 91. The service estimation module 23 further comprises a packet analyzer 231 and a service estimator 239.

Specifically, in the second embodiment, the Bluetooth host 91 firstly searches for surrounding devices and, when a remote Bluetooth device 93 is searched out, connects to the remote Bluetooth device 93 via the Bluetooth controller 97. Then, the Bluetooth host 91 transmits a connection inquiry packet 720 to the remote Bluetooth device 93 which, in turn, returns a connection response packet 722 to the Bluetooth host 91 according to the connection inquiry packet 720, in this way, initial pairing between the Bluetooth host 91 and the remote Bluetooth device 93 can be completed.

Meanwhile, similarly, the Bluetooth service estimation apparatus 2 disposed in the Bluetooth controller 97 can use the transceiver 21 to listen to at least one data packet transmitted between the Bluetooth host 91 and the remote Bluetooth device 93. According to the aforesaid pairing process, the at least one data packet at least comprises the connection response packet 722 transmitted from the remote Bluetooth device 93 to the Bluetooth host 91. Further speaking, the connection response packet 722 transmitted from the remote Bluetooth device 93 during the pairing process usually comprises information about which device type does the remote Bluetooth device 93 belong to. Hence, after the connection response packet 722 is detected by the transceiver 21, the packet analyzer 231 can analyze contents of the connection response packet 722 and determine the device type of the remote Bluetooth device 93 according to the contents of the connection response packet 722.

In detail, the connection response packet 722 described herein is a Frequency Hopping Synchronization (FHS)

packet. Because the FHS packet has a Class of Service (COD) field, the packet analyzer 231 can determine that the remote Bluetooth device 93 is one of a computer device, a mobile phone device, an audio device and a human interface device (HID) according to a major part of the COD field, and then make further determination according to a minor part of the COD field.

In the second embodiment, when the packet analyzer 231 determines that the remote Bluetooth device 93 is an HID according to the COD field of the FHS packet, the service estimator 239 can determine that a Bluetooth service type 81 between the Bluetooth host 91 and the remote Bluetooth device 93 is an HID service according to the determination of the packet analyzer 231. Likewise, the transceiver 21 then transmits the Bluetooth service type 81 to the packet traffic arbitration module 951 of the Wi-Fi host 95 so that the packet traffic arbitration module 951 determines a weight of network resources according to the Bluetooth service type 81 and decides a utilization rate of an antenna according to the weight of the network resources.

On the other hand, when the packet analyzer 231 determines that the remote Bluetooth device 93 is an audio device according to the COD field of the FHS packet, the service estimator 239 can determine that the Bluetooth service type 81 between the Bluetooth host 91 and the remote Bluetooth device 93 is an audio device service according to the determination of the packet analyzer 231. Likewise, the transceiver 21 then transmits the Bluetooth service type 81 to the packet traffic arbitration module 951 of the Wi-Fi host 95 so that the packet traffic arbitration module 951 determines the weight of the network resources according to the Bluetooth service type 81 and decides the utilization rate of the antenna according to the weight of the network resources.

Figure 3A:
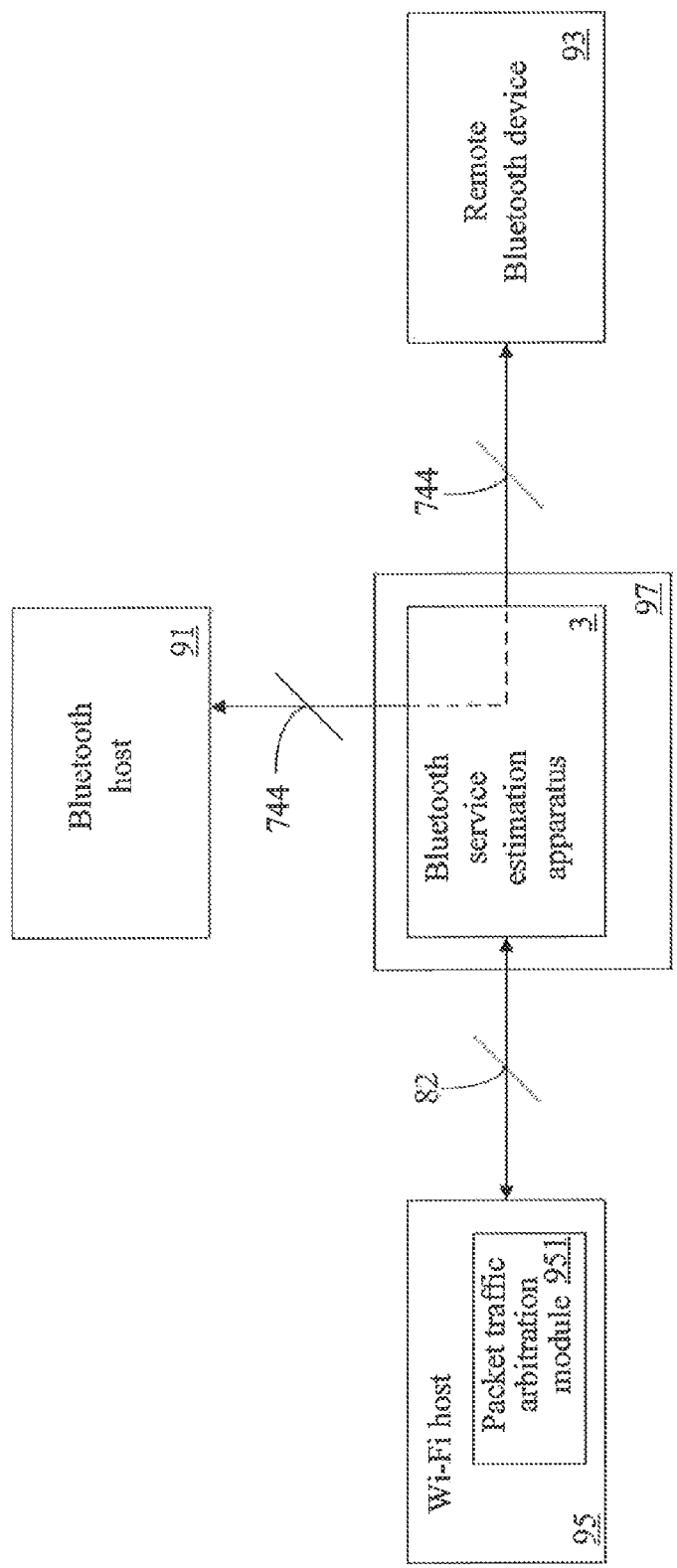
FIG. 3A is a schematic view illustrating connection relationships for a Bluetooth service estimation apparatus according to a third embodiment of the present invention.
Figure 3B:
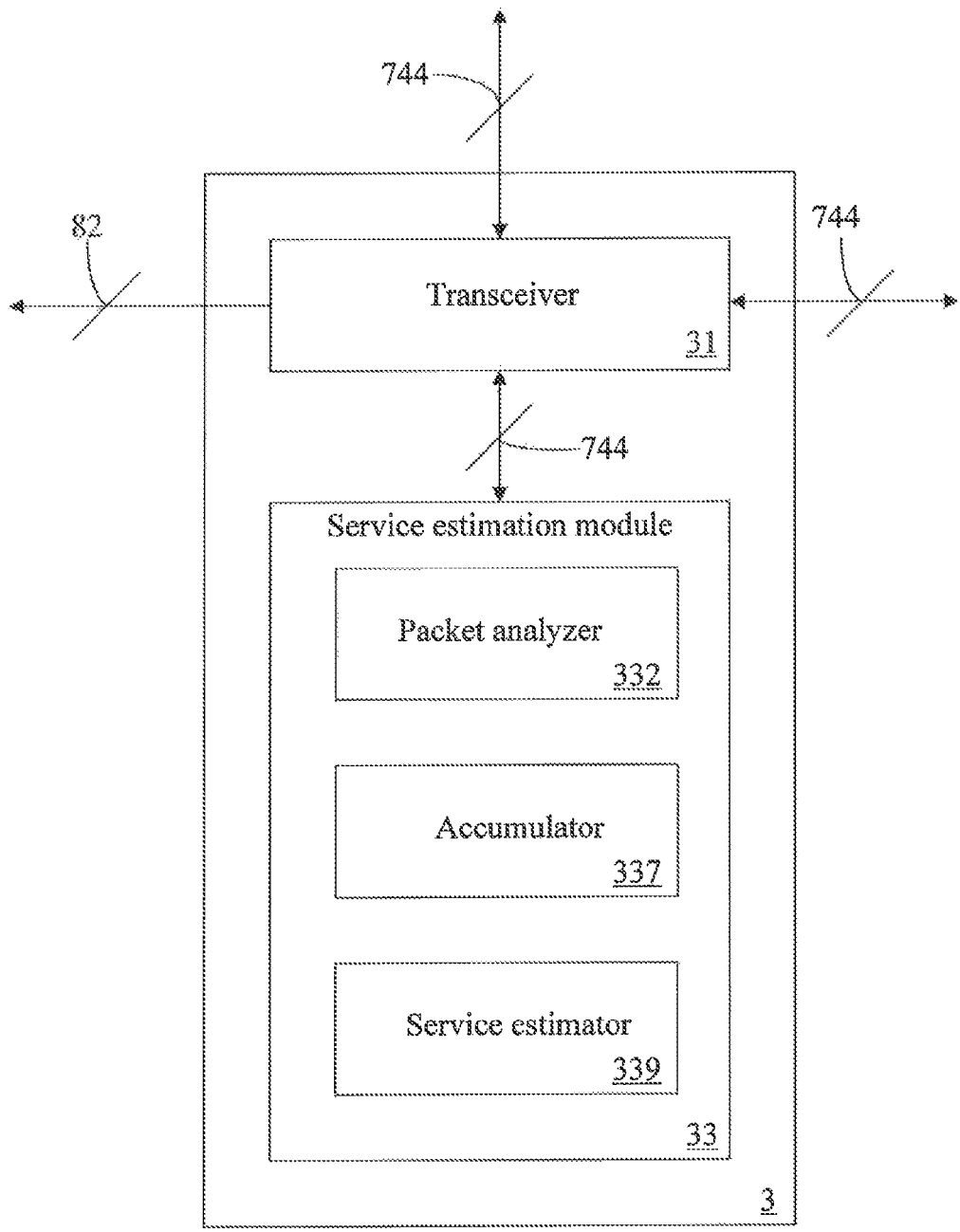
FIG. 3B is a schematic view illustrating the Bluetooth service estimation apparatus according to the third embodiment of the present invention.

Next, refer to FIG. 3A to FIG. 3B. FIG. 3A is a schematic view illustrating connection relationships for a Bluetooth service estimation apparatus 3 according to a third embodiment of the present invention; and FIG. 3B is a schematic view illustrating the Bluetooth service estimation apparatus 3 according to the third embodiment of the present invention. The Bluetooth service estimation apparatus 3 comprises a transceiver 31 and a service estimation module 33. The Bluetooth service estimation apparatus 3 is disposed in a Bluetooth controller 97, and is electrically connected with a packet traffic arbitration module 951 of a Wi-Fi host 95 and a Bluetooth host 91. Likewise, the service estimation module 33 comprises a packet analyzer 332 and a service estimator 339.

After the Bluetooth host 91 is paired and connected with a remote Bluetooth device 93 via the Bluetooth controller 97, the Bluetooth service estimation apparatus 3 can also determine a service type according to a general data packet. Specifically, when the Bluetooth host 91 is paired and connected in a usual way with the remote Bluetooth device 93 via the Bluetooth controller 97, the Bluetooth service estimation apparatus 3 disposed in the Bluetooth controller 97 can also use the transceiver 31 to listen to at least one data packet transmitted between the Bluetooth host 91 and the remote Bluetooth device 93. The at least one data packet further comprises a service packet 744. Subsequently, after the service packet 744 is detected by the transceiver 31, the packet analyzer 332 analyzes contents of the service packet 744 to determine the type of connection between the Bluetooth host 91 and the remote Bluetooth device 93.

Specifically in the third embodiment, the packet analyzer 332 can firstly determine that the service packet 744 is an asynchronous connectionless (ACL) packet according to a data type bit of the service packet 744, and then the service estimator 339 can determine that a Bluetooth service type 82 between the Bluetooth host 91 and the remote Bluetooth device 93 is an ACL service according to the determination of the packet analyzer 332. Likewise, the transceiver 31 then transmits the Bluetooth service type 82 to the packet traffic arbitration module 951 of the Wi-Fi host 95 so that the packet traffic arbitration module 951 determines a weight of network resources according to the Bluetooth service type 82 and decides a utilization rate of an antenna according to the weight of the network resources.

In other implementations of the third embodiment, the type of the ACL service may be further estimated. In detail, in an implementation, the Bluetooth service estimation apparatus 3 may further comprise an accumulator 337. The accumulator 337 is configured to accumulate a plurality of ACL data packets (not shown) transmitted between the Bluetooth host 91 and the remote Bluetooth device 93 after the service estimator 339 determines that the Bluetooth service type 82 is an ACL service, and determine whether a total data amount of the ACL data packets exceeds a data threshold value within a fixed time period.

If the total data amount of the ACL data packets exceeds the data threshold value within the fixed time period, the service estimator 339 can determine that the ACL service is of a service type that transmits massive data, e.g., one of a Personal Area Network (PAN) service, a File Transfer Profile (FTP) service and an Object Push Profile (OPP) service.

An advanced audio distribution profile (A2DP) service is an ACL service, and the data packet thereof has an auto-flushable flag bit. Therefore, when the packet analyzer 332 determines that the connection type of the service packet 744 is an ACL type and determines that the service packet 744 has the auto-flushable flag hit, the service estimator 4339 can further determine that a Bluetooth service type 82 between the Bluetooth host 91 and the remote Bluetooth device 93 is the advanced audio distribution profile (A2DP) service according to the determinations of the packet analyzer 332.

Or, because a data packet of an advanced audio distribution profile (A2DP) service usually has a specific Sync Word byte, the packet analyzer 332 may also be configured to determine whether the service packet 744 has the Sync Word byte. If the service packet 744 does have the Sync Word byte, the service estimator 339 can further determine that the Bluetooth service type 82 between the Bluetooth host 91 and the remote Bluetooth device 93 is the A2DP service according to the determination of the header analyzer 332.

Similarly, when the service estimator 339 further determines that the Bluetooth service type 82 between the Bluetooth host 91 and the remote Bluetooth device 93 is one of a PAN service, an FTP service, an OPP service or an A2DP service of the ACL service, the transceiver 31 transmits the Bluetooth service type 82 to the packet traffic arbitration module 951 of the Wi-Fi host 95 so that the packet traffic arbitration module 951 determines a weight of network resources according to the Bluetooth service type 81 and decides a utilization rate of an antenna according to the weight of the network resources.

Figure 4A:
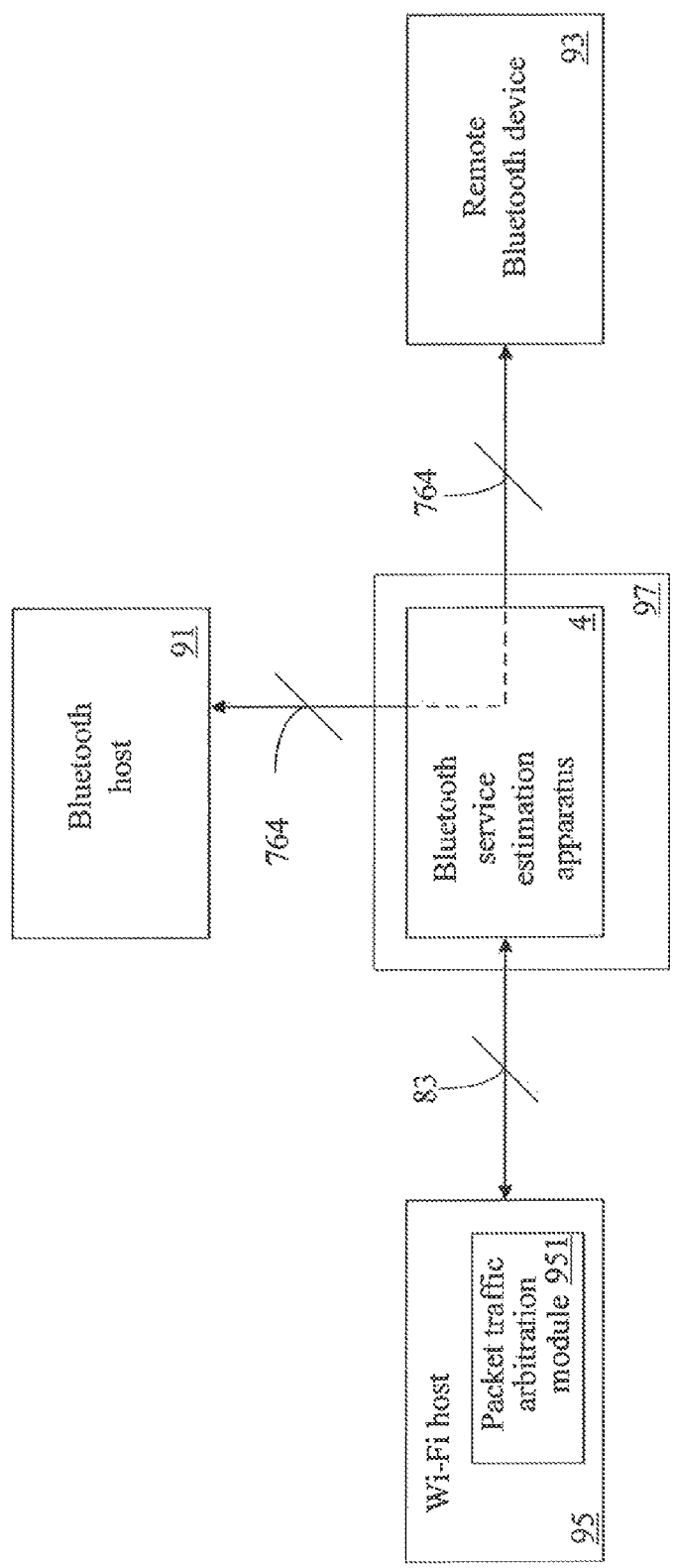
FIG. 4A is a schematic view illustrating connection relationships for a Bluetooth service estimation apparatus according to a fourth embodiment of the present invention.
Figure 4B:
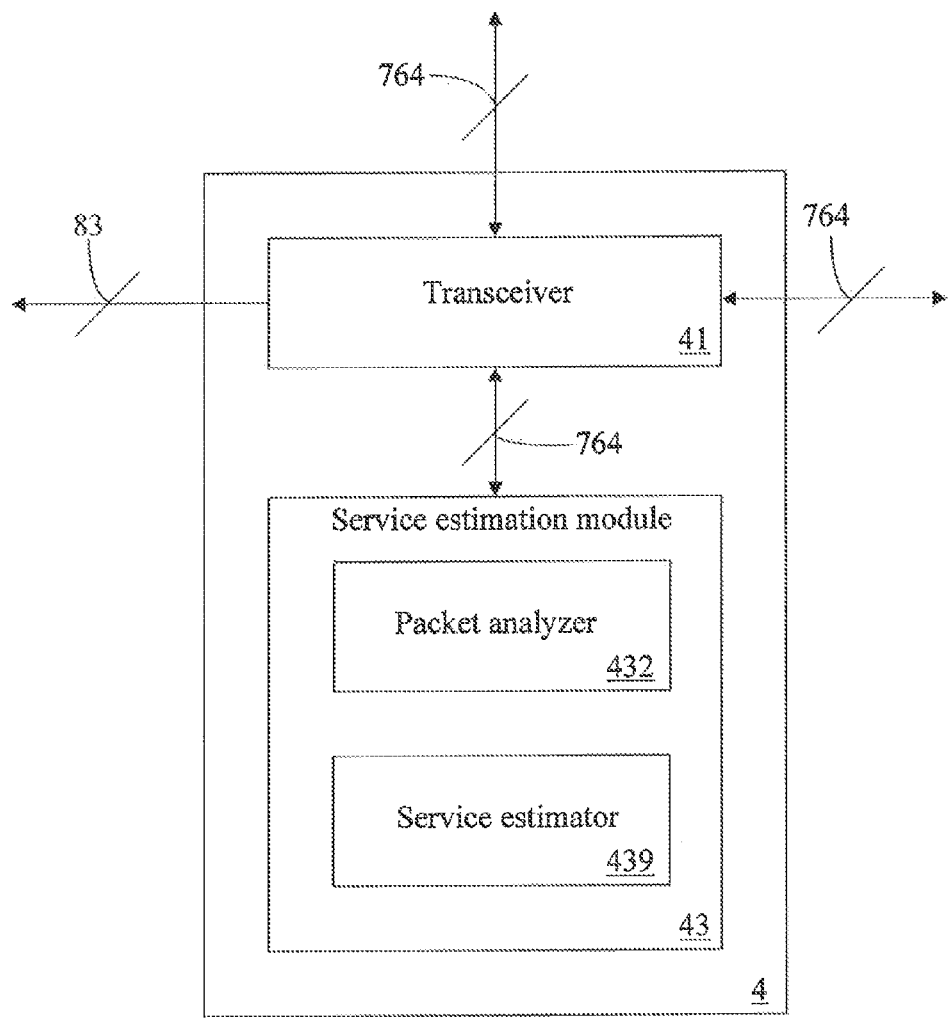
FIG. 4B is a schematic view illustrating the Bluetooth service estimation apparatus according to the fourth embodiment of the present invention.

Next, refer to FIG. 4A to FIG. 4B. FIG. 4A is a schematic view illustrating connection relationships for a Bluetooth service estimation apparatus 4 according to a fourth embodiment of the present invention; and FIG. 4B is a schematic view illustrating the Bluetooth service estimation apparatus 4 according to the fourth embodiment of the present invention. The Bluetooth service estimation apparatus 4 comprises a transceiver 41 and a service estimation module 43. The Bluetooth service estimation apparatus 4 is disposed in a Bluetooth controller 97, and is electrically connected with a packet traffic arbitration module 951 of a Wi-Fi host 95 and a Bluetooth host 91. The service estimation module 43 further comprises a packet analyzer 432 and a service estimator 439.

After the Bluetooth host 91 is paired and connected with a remote Bluetooth device 93 via the Bluetooth controller 97, the Bluetooth service estimation apparatus 4 can also determine a service type by means of a general data packet. Specifically, when the Bluetooth host 91 is paired and connected in a usual way with the remote Bluetooth device 93 via the Bluetooth controller 97, the Bluetooth service estimation apparatus 4 disposed in the Bluetooth controller 97 can also use the transceiver 41 to detect at least one data packet transmitted between the Bluetooth host 91 and the remote Bluetooth device 93. The at least one data packet further comprises a service packet 764. Subsequently, after the service packet 764 is detected by the transceiver 41, the packet analyzer 432 can determine the service type between the Bluetooth host 91 and the remote Bluetooth device 93 by analyzing contents of the service packet 764.

Specifically in the fourth embodiment, the packet analyzer 432 can firstly determine that the service packet 764 is an Link Manager Protocol (LMP) packet and, according to an Synchronous Connection Oriented (SCO) acceptance message of the LMP packet, determine that an SCO connection has been established through an SCO establishment process between the Bluetooth host 91 and the remote Bluetooth device 93. Then, the service estimator 439 can determine that a Bluetooth service type 83 between the Bluetooth host 91 and the remote Bluetooth device 93 is an SCO service according to the determination of the packet analyzer 432.

Likewise, the transceiver 41 then transmits the Bluetooth service type 83 to the packet traffic arbitration module 951 of the Wi-Fi host 95 so that the packet traffic arbitration module 951 determines a weight of network resources according to the Bluetooth service type 83 and decides a utilization rate of an antenna according to the weight of the network resources.

Figure 5A:
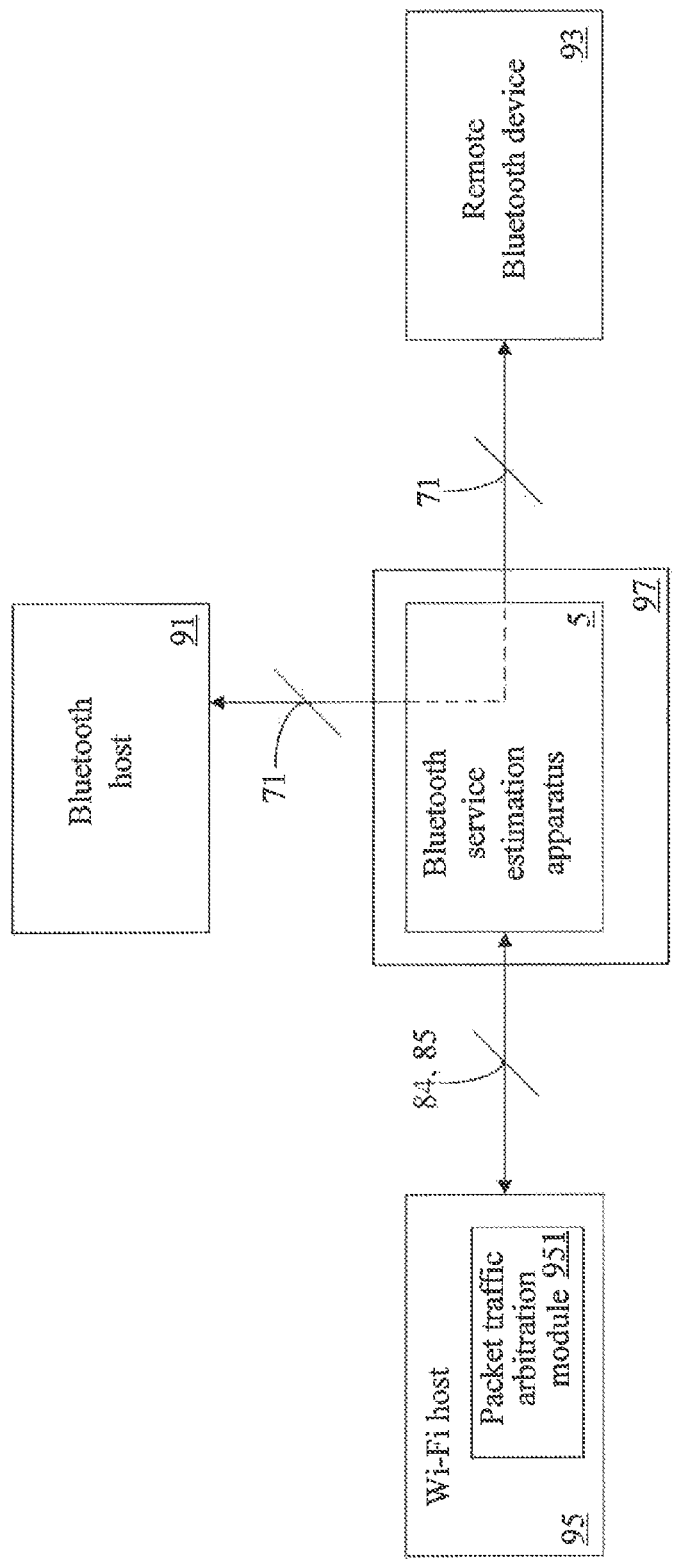
FIG. 5A is a schematic view illustrating connection relationships for a Bluetooth service estimation apparatus according to a fifth embodiment of the present invention.
Figure 5B:
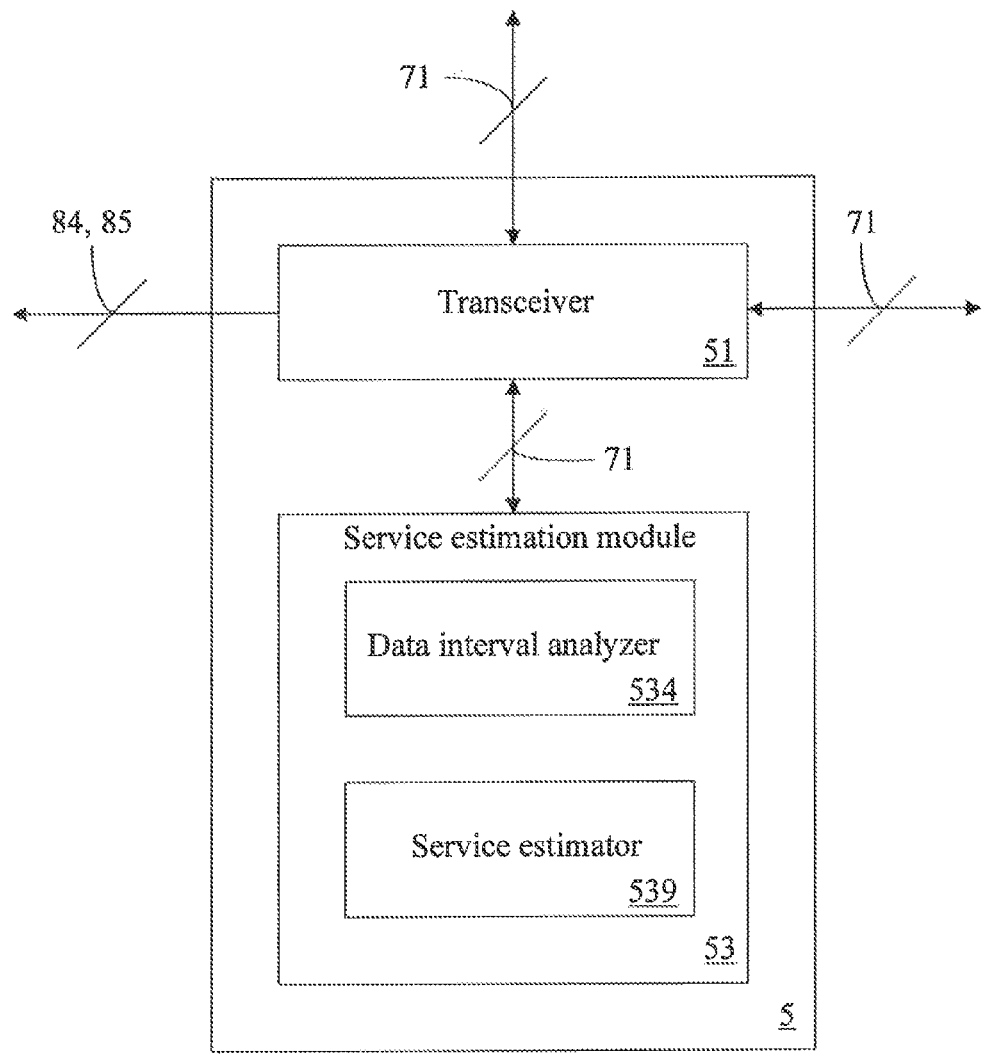
FIG. 5B is a schematic view illustrating the Bluetooth service estimation apparatus according to the fifth embodiment of the present invention.

Next, refer to FIG. 5A to FIG. 5B. FIG. 5A is a schematic view illustrating connection relationships for a Bluetooth service estimation apparatus 5 according to a fifth embodiment of the present invention; and FIG. 5B is a schematic view illustrating the Bluetooth service estimation apparatus 5 according to the fifth embodiment of the present invention. The Bluetooth service estimation apparatus 5 comprises a transceiver 51 and a service estimation module 53. The Bluetooth service estimation apparatus 5 is disposed in a Bluetooth controller 97, and is electrically connected with a packet traffic arbitration module 951 of a Wi-Fi host 95 and a Bluetooth host 91. The service estimation module 53 further comprises a data interval analyzer 534 and a service estimator 539.

Specifically, after the Bluetooth host 91 is paired and connected with a remote Bluetooth device 93 via the Bluetooth controller 97, the Bluetooth service estimation apparatus 5 disposed in the Bluetooth controller 97 can determine a service mode or type according to a transmission interval of a data packet. In detail, among Bluetooth data transmission modes, the Bluetooth sniff mode is a mode that allows for more saving of electric power, so the data transmission interval of the Bluetooth sniff mode is also different from general data transmission intervals. Thus, because different services have different sniff intervals, the sniff intervals can also be used as a basis for determining the services.

Further speaking, when at least one data packet 71 is transmitted between the Bluetooth host 91 and the remote Bluetooth device 93 via the Bluetooth controller 97 in the Bluetooth sniff mode, the data interval analyzer 534 can, in the Bluetooth sniff mode, determine that a sniff interval of the remote Bluetooth device 93 matches an HID sniff interval according to contents of the at least one data packet 71 transmitted from the remote Bluetooth device 93 to the Bluetooth host 91. Then, the service estimator 539 can determine that a Bluetooth service type 84 is an HID service according to the determination of the data interval analyzer 534. Likewise, the transceiver 51 then transmits the Bluetooth service type 84 to the packet traffic arbitration module 951 of the Wi-Fi host 95 so that the packet traffic arbitration module 951 determines a weight of network resources according to the Bluetooth service type 84 and decides a utilization rate of an antenna according to the weight of the network resources.

On the other hand, the data interval analyzer 534 can also independently determine that an operation mode 85 of the remote Bluetooth device 93 is an idle mode or an active mode according to a transmission interval of the at least one data packet 71, and transmit the operation mode 85 to the packet traffic arbitration module 951 of the Wi-Fi host 95 via the transceiver 51. Thereby, the packet traffic arbitration module 951 determines the weight of the network resources according to the operation mode 85 and the aforesaid Bluetooth service type, and decides the utilization rate of the antenna according to the weight of the network resources. Of course, when the operation mode 85 of the remote Bluetooth device 93 is the idle mode, the proportion of the network resources used by the Bluetooth modules can be decreased; and otherwise, when the operation mode 85 of the remote Bluetooth device 93 is the active mode, the proportion of the network resources used by the Bluetooth modules can be increased.

Figure 6A:
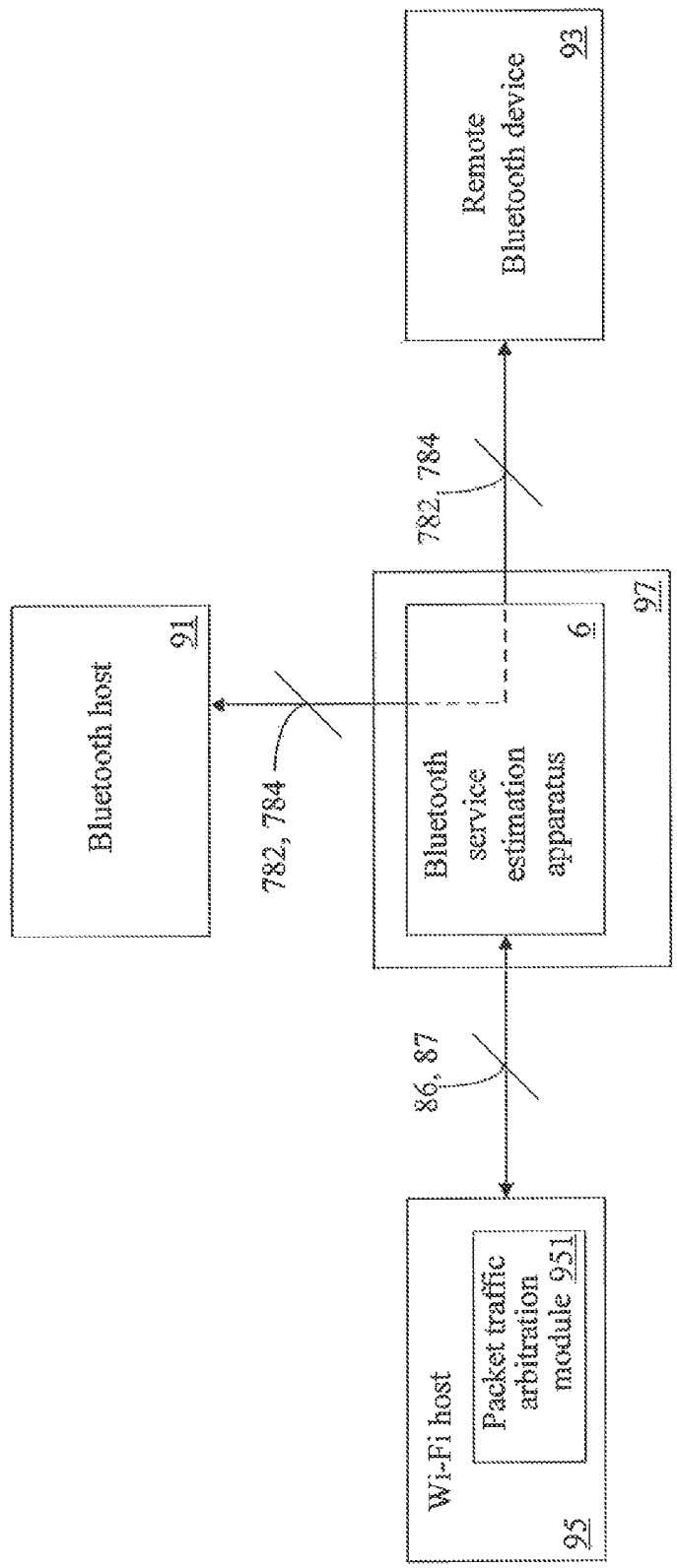
FIG. 6A is a schematic view illustrating connection relationships for a Bluetooth service estimation apparatus according to a sixth embodiment of the present invention.
Figure 6B:
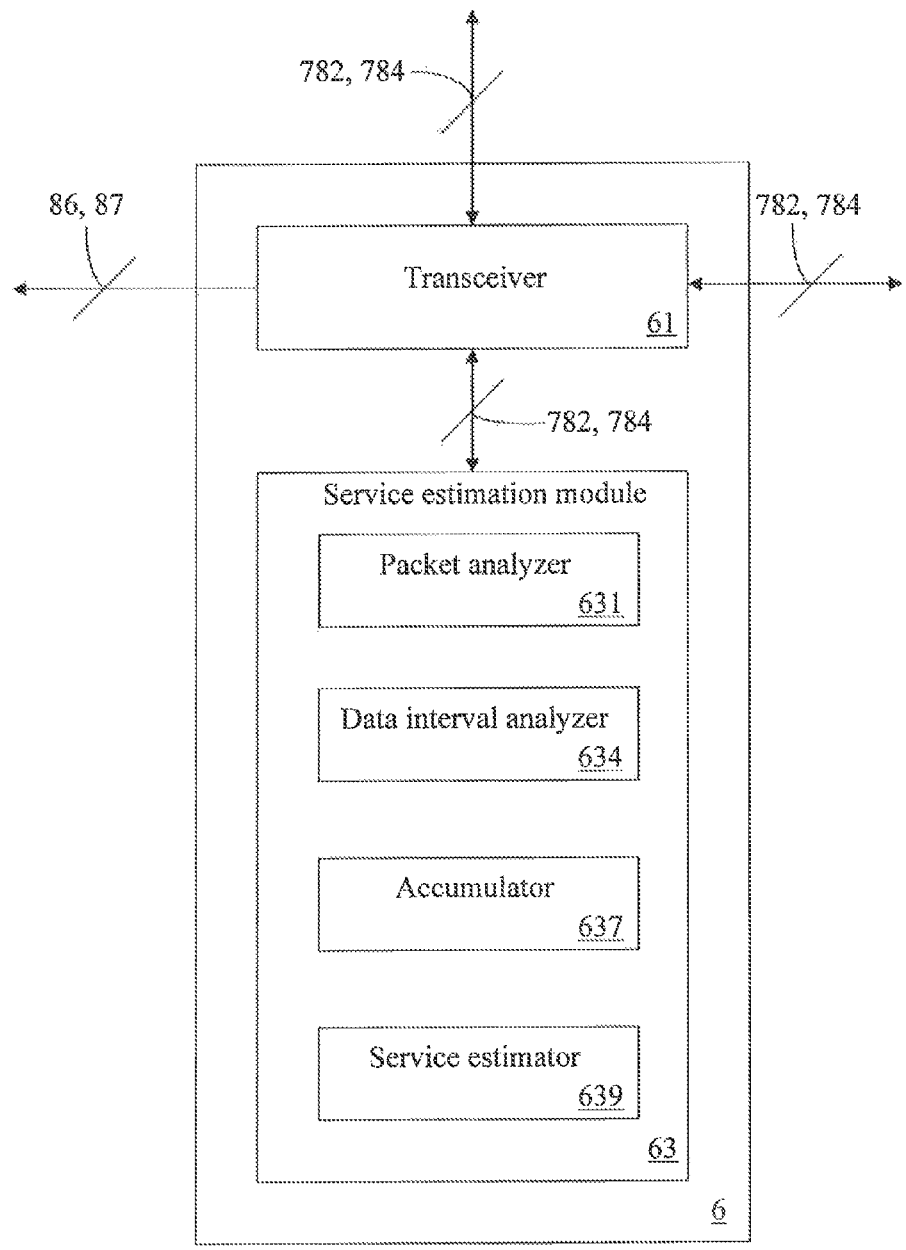
FIG. 6B is a schematic view illustrating the Bluetooth service estimation apparatus according to the sixth embodiment of the present invention.

The present invention may also complete any of the aforesaid determination of Bluetooth service types by integrating the aforesaid technical disclosures. Specifically, refer to FIG. 6A to FIG. 6B. FIG. 6A is a schematic view illustrating connection relationships for a Bluetooth service estimation apparatus 6 according to a sixth embodiment of the present invention; and FIG. 6B is a schematic view illustrating the Bluetooth service estimation apparatus 6 according to the sixth embodiment of the present invention. The Bluetooth service estimation apparatus 6 comprises a transceiver 61 and a service estimation module 63, and is electrically connected with a packet traffic arbitration module 951 of a Wi-Fi host 95 and a Bluetooth host 91. The service estimation module 63 further comprises a packet analyzer 631, a data interval analyzer 634, an accumulator 637 and a service estimator 639.

Further speaking, the transceiver 61 of the Bluetooth service estimation apparatus 6 is configured to listen to at least one data packet transmitted between the Bluetooth host 91 and a remote Bluetooth device 93. The at least one data packet at least comprises an FHS packet 782 transmitted from the remote Bluetooth device 93 to the Bluetooth host 91 and a service packet 784 transmitted between the remote Bluetooth device 93 and the Bluetooth host 91. Firstly, during the device pairing, the packet analyzer 631 may be configured to analyze contents of the FHS packet 782, and preliminarily determine a device type of the remote Bluetooth device 93 according to the COD field of the FHS packet 782. If the remote Bluetooth device 93 is an HID, then the service estimator 639 determines that a Bluetooth service type 86 is an HID service; and if the remote Bluetooth device 93 is an audio device, then the service estimator 639 determines that the Bluetooth service type 86 is an audio device service.

Or, contents of the service packet 784 may be analyzed by the packet analyzer 632 during the device connection to determine that a connection type between the Bluetooth host 91 and the remote Bluetooth device 93 is an ACL type or an SCO type. If the packet analyzer 632 determines that the service packet 784 is an ACL packet, then the service estimator 639 determines that the Bluetooth service type 86 is an ACL service. On the other hand, if the service packet 784 is analyzed to be an LMP packet having an SCO acceptance message by the packet analyzer 632, then it can be determined that an SCO connection has been established between the Bluetooth host 91 and the remote Bluetooth device 93 and the service estimator 639 can determine that the Bluetooth service type 86 is an SCO service.

On the other hand, if the Bluetooth service type 86 is an ACL service, the accumulator 637 can accumulate a plurality of ACL data packets transmitted between the Bluetooth host 91 and the remote Bluetooth device 93 and determine whether a total data amount of the ACL data packets exceeds a data threshold value within a fixed time period so that the service estimator 639 determines that the ACL service is one of a PAN service, an FTP service and an OPP service according to the determination of the accumulator 637.

Further, if the Bluetooth service type 86 is an ACL service, the packet analyzer 632 may also determine whether the service packet 784 has an auto-flushable flag bit or a Sync Word byte. If the service packet 784 has an auto-flushable flag bit or a Sync Word byte, then the service estimator 639 can determine that the Bluetooth service type 86 between the Bluetooth host 91 and the remote Bluetooth device 93 is an A2DP service.

Similarly, the data interval analyzer 634 can, in a Bluetooth sniff mode, determine whether a sniff interval of the remote Bluetooth device 93 matches an HID sniff interval of a human interface device according to contents of the at least one data packet. If the answer is yes, which represents that the remote Bluetooth device 93 is an HID, then the service estimator 639 can determine that the Bluetooth service type 86 is an HID service.

Further, the data interval analyzer 634 can determine that an operation mode 87 of the remote Bluetooth device 93 is an idle mode or an active mode according to a transmission interval of the at least one data packet, and transmit the operation mode 87 to the packet traffic arbitration module 951 of the Wi-Fi host 95 via the transceiver 61. Thereby, the packet traffic arbitration module 951 determines the weight of the network resources according to the operation mode 87 and the aforesaid Bluetooth service type, and decides the utilization rate of the antenna according to the weight of the network resources.

Figure 7:
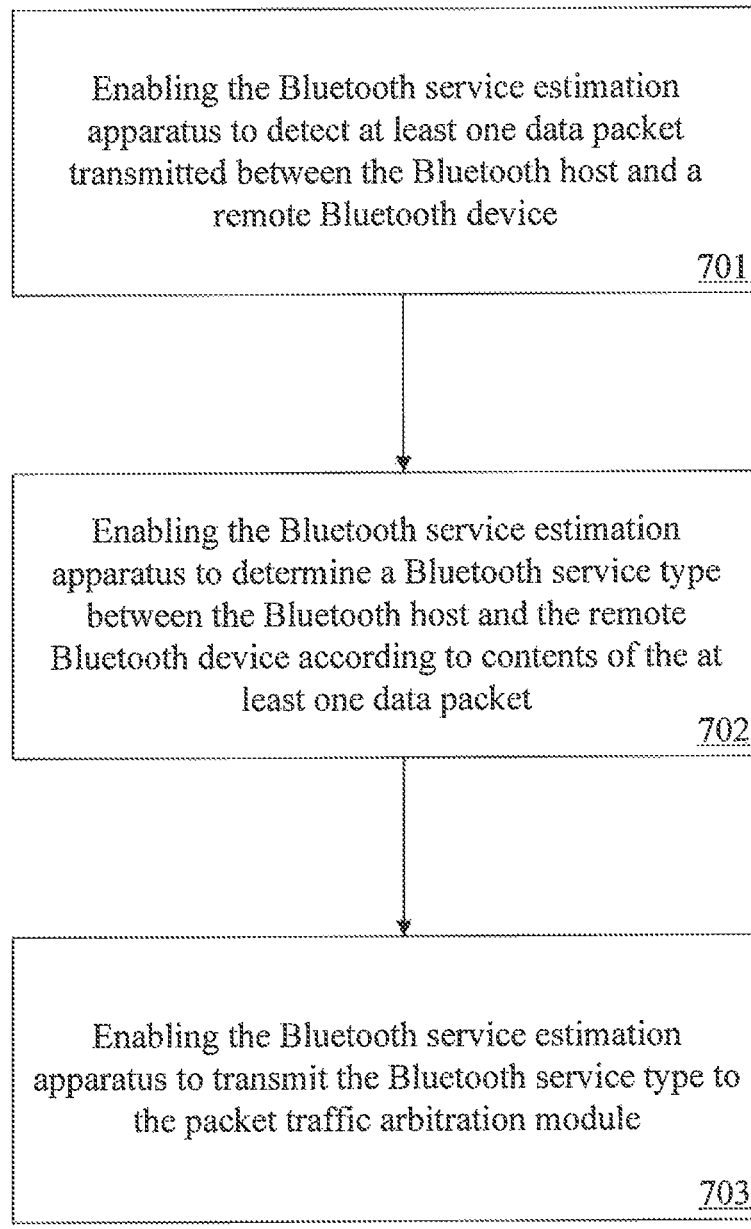
FIG. 7 is a flowchart diagram of a Bluetooth service estimation method according to a seventh embodiment of the present invention.

Referring next to FIG. 7, there is shown a flowchart diagram of a Bluetooth service estimation method according to a seventh embodiment of the present invention. The method of the seventh embodiment is for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the seventh embodiment are detailed as follows.

Firstly, step 701 is executed to enable the Bluetooth service estimation apparatus to detect at least one data packet transmitted between the Bluetooth host and a remote Bluetooth device. Then, step 702 is executed to enable the Bluetooth service estimation apparatus to determine a Bluetooth service type between the Bluetooth host and the remote Bluetooth device according to contents of the at least one data packet. Finally, step 703 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 8:
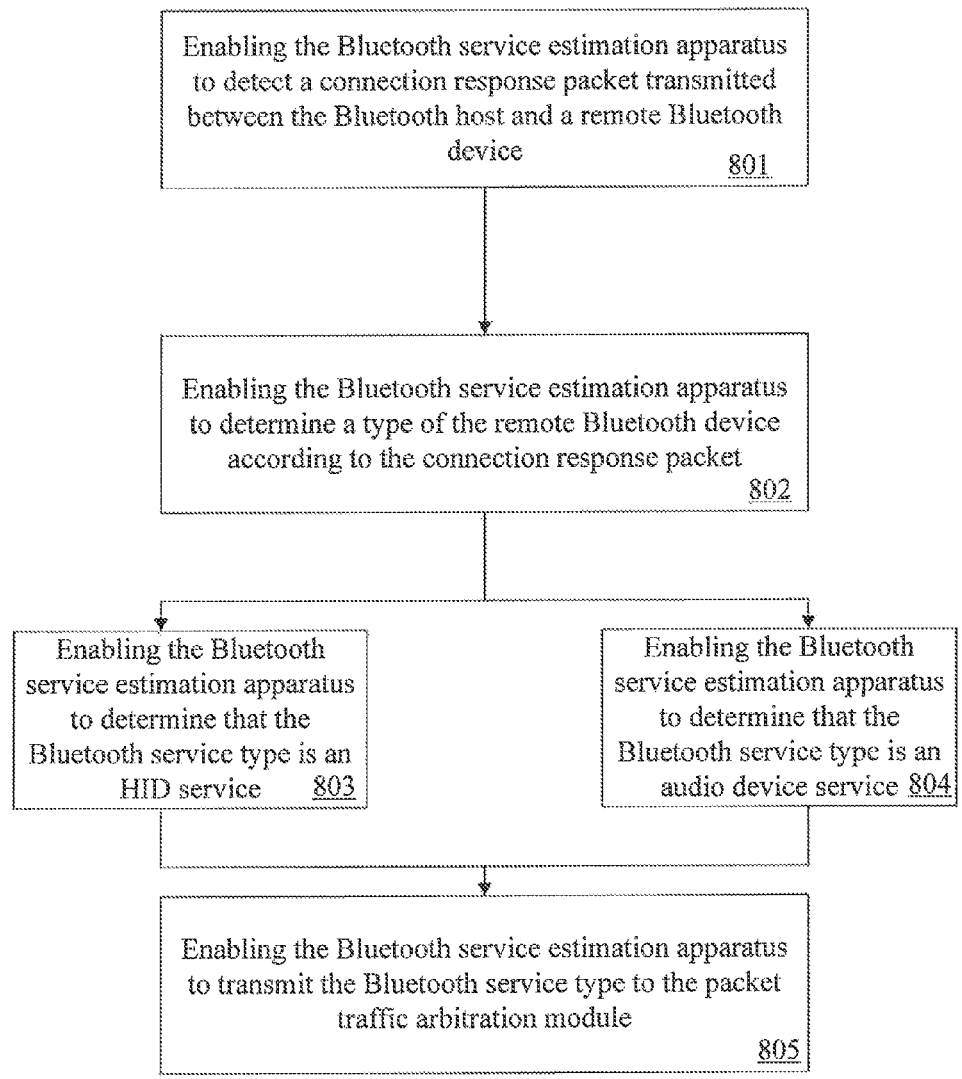
FIG. 8 is a flowchart diagram of a Bluetooth service estimation method according to an eighth embodiment of the present invention.

Referring next to FIG. 8, there is shown a flowchart diagram of a Bluetooth service estimation method according to an eighth embodiment of the present invention. The method of the eighth embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the eighth embodiment are detailed as follows.

Firstly, step 801 is executed to enable the Bluetooth service estimation apparatus to detect at least one data packet transmitted between the Bluetooth host and a remote Bluetooth device, wherein the at least one data packet comprises a connection response packet which is an FHS packet. Step 802 is executed to enable the Bluetooth service estimation apparatus to determine a device type (e.g., a computer device, a mobile phone device, an audio device, an HID or the like) of the remote Bluetooth device according to a COD field of the FHS packet.

If the remote Bluetooth device is an HID, then step 803 is executed to enable the Bluetooth service estimation apparatus to determine that the Bluetooth service type is an HID service; and if the remote Bluetooth device is an audio device, then step 804 is executed to enable the Bluetooth service estimation apparatus to determine that the Bluetooth service type is an audio device service. Finally, step 805 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 9:
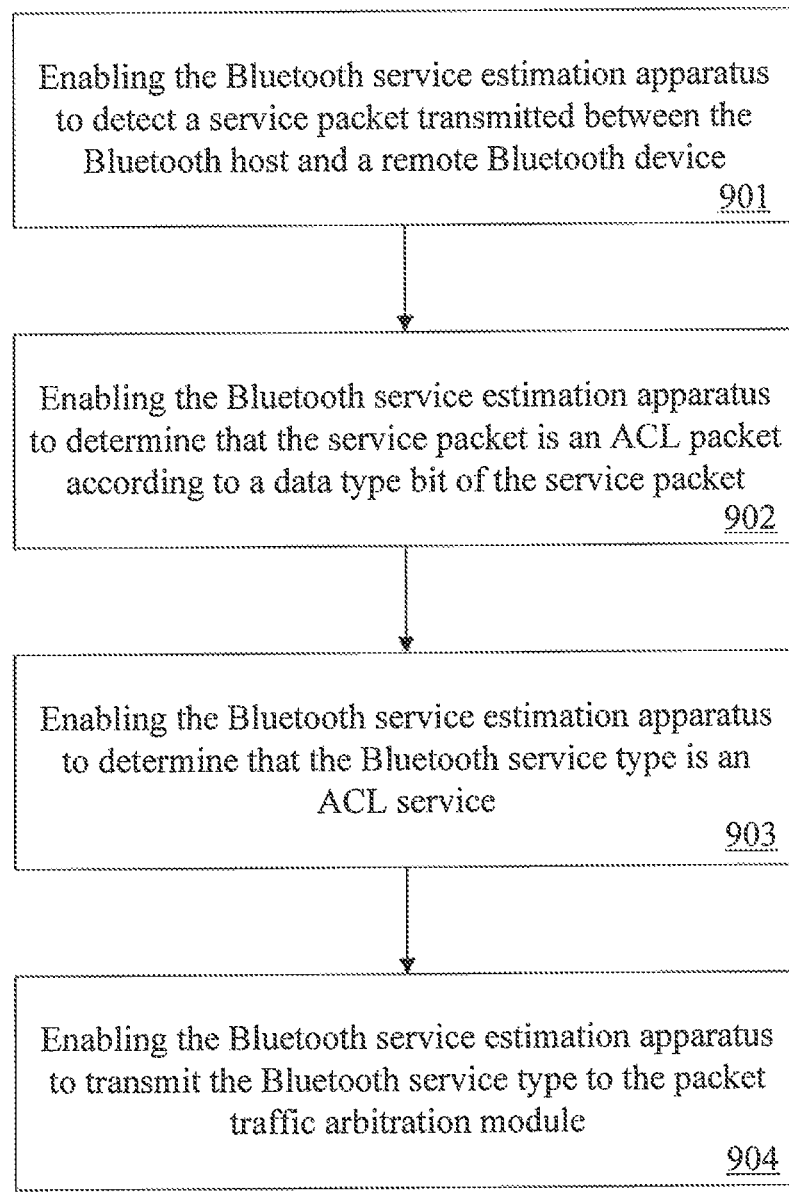
FIG. 9 is a flowchart diagram of a Bluetooth service estimation method according to a ninth embodiment of the present invention.

Referring next to FIG. 9, there is shown a flowchart diagram of a Bluetooth service estimation method according to a ninth embodiment of the present invention. The method of the ninth embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the ninth embodiment are detailed as follows.

Firstly, step 901 is executed to enable the Bluetooth service estimation apparatus to detect at least one data packet transmitted between the Bluetooth host and a remote Bluetooth device. The at least one data packet comprises a service packet. Step 902 is executed to enable the Bluetooth service estimation apparatus to determine that the service packet transmitted between the Bluetooth host and the remote Bluetooth device is an ACL packet according to a data type bit of the service packet. Then, step 903 is executed to enable the Bluetooth service estimation apparatus to determine that the Bluetooth service type is an ACL service. Finally, step 904 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 10:
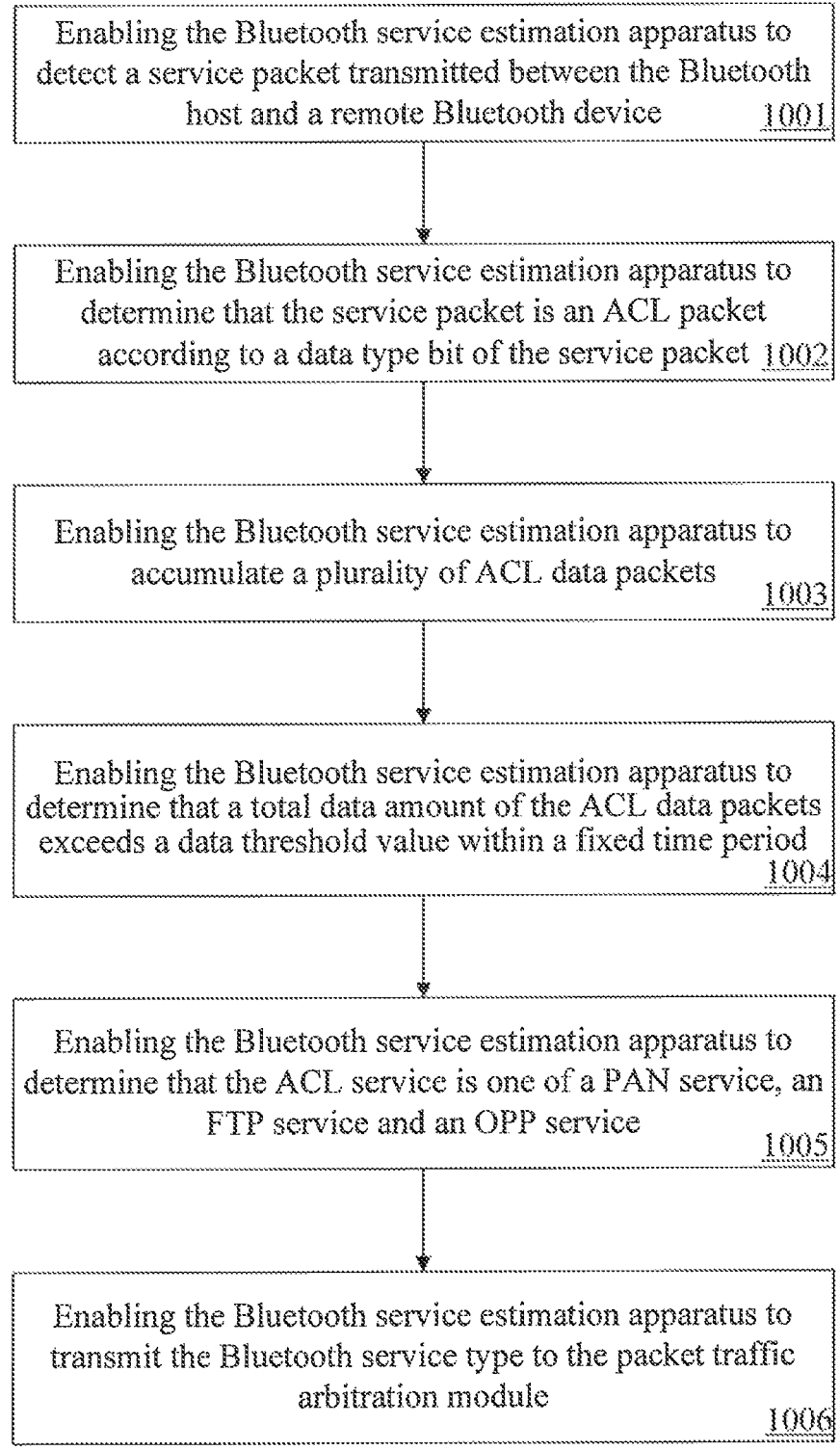
FIG. 10 is a flowchart diagram of a Bluetooth service estimation method according to a tenth embodiment of the present invention.

Referring next to FIG. 10, there is shown a flowchart diagram of a Bluetooth service estimation method according to a tenth embodiment of the present invention. The method of the tenth embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the tenth embodiment are detailed as follows.

Firstly, step 1001 is executed to enable the Bluetooth service estimation apparatus to detect at least one data packet transmitted between the Bluetooth host and a remote Bluetooth device. The at least one data packet comprises a service packet. Step 1002 is executed to enable the Bluetooth service estimation apparatus to determine that the service packet is an ACL packet according to a data type bit of the service packet. Step 1003 is executed to enable the Bluetooth service estimation apparatus to accumulate a plurality of ACL data packets.

Then, step 1004 is executed to enable the Bluetooth service estimation apparatus to determine that a total data amount of the ACL data packets exceeds a data threshold value within a fixed time period. Next, step 1005 is executed to enable the Bluetooth service estimation apparatus to determine that the ACL service is one of a PAN service, an FTP service and an OPP service. Finally, step 1006 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 11:
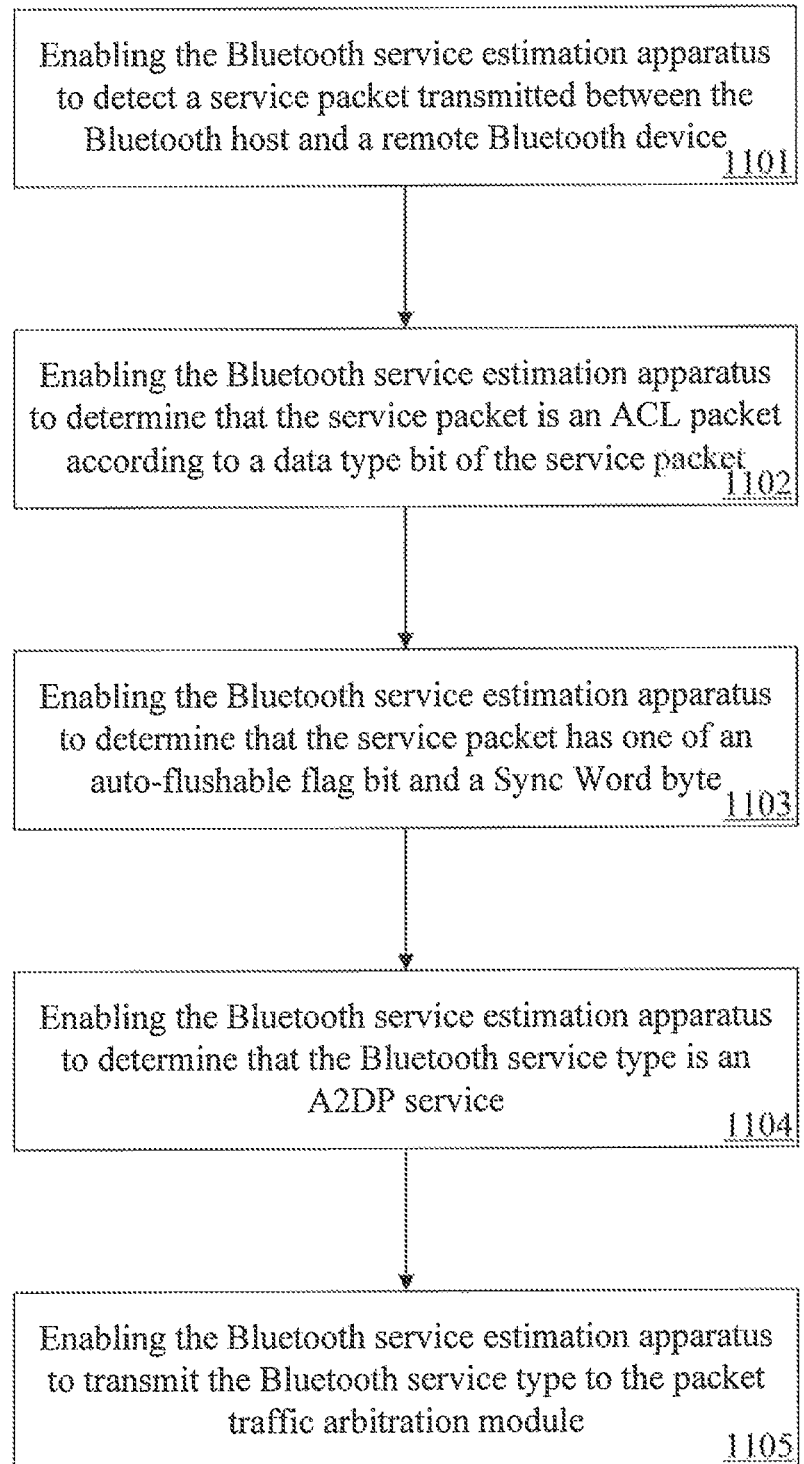
FIG. 11 is a flowchart diagram of a Bluetooth service estimation method according to an eleventh embodiment of the present invention.

Referring next to FIG. 11, there is shown a flowchart diagram of a Bluetooth service estimation method according to an eleventh embodiment of the present invention. The method of the eleventh embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the eleventh embodiment are detailed as follows.

Firstly, step 1101 is executed to enable the Bluetooth service estimation apparatus to detect at least one data packet transmitted between the Bluetooth host and a remote Bluetooth device. The at least one data packet comprises a service packet. Step 1102 is executed to enable the Bluetooth service estimation apparatus to determine that the service packet is an ACL packet according to a data type bit of the service packet. Then, step 1103 is executed to enable the Bluetooth service estimation apparatus to determine that the service packet has one of an auto-flushable flag bit and a Sync Word byte.

Subsequently, step 1104 is executed to enable the Bluetooth service estimation apparatus to determine that the Bluetooth service type is an A2DP service. Finally, step 1105 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 12:
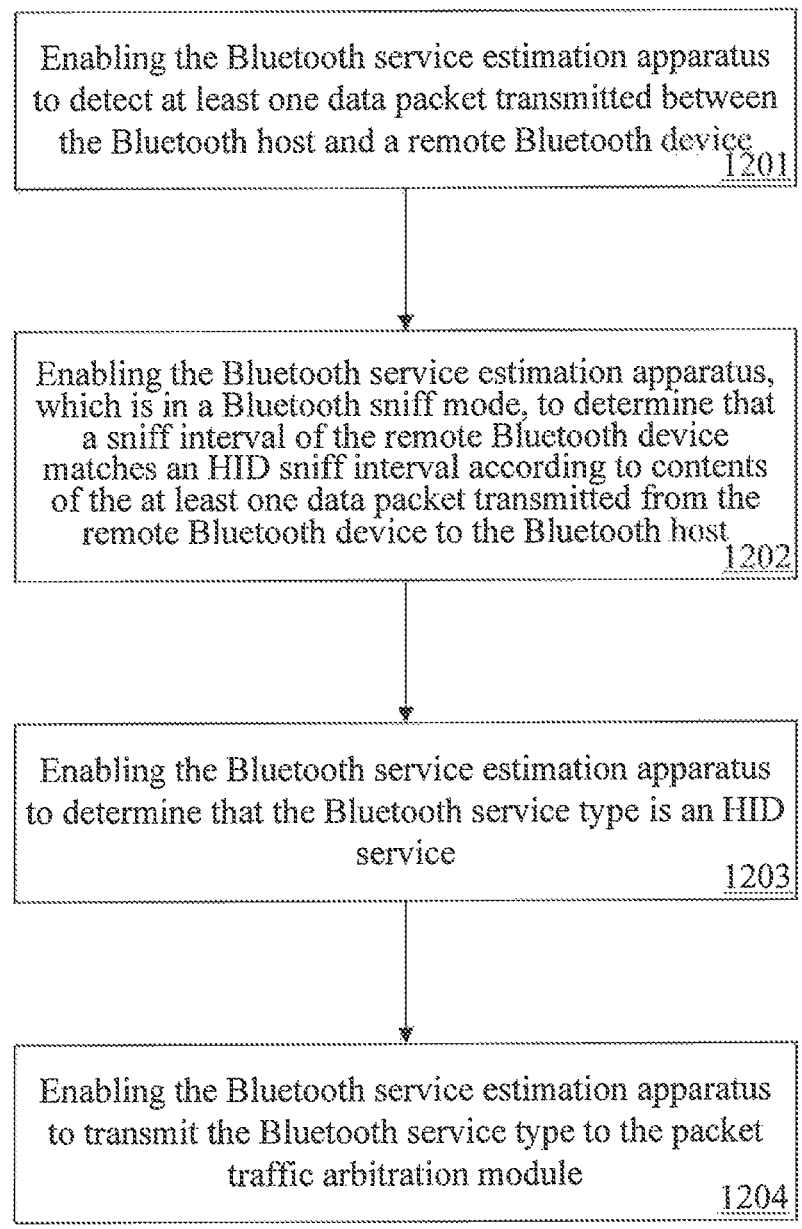
FIG. 12 is a flowchart diagram of a Bluetooth service estimation method according to a twelfth embodiment of the present invention.

Referring next to FIG. 12, there is shown a flowchart diagram of a Bluetooth service estimation method according to a twelfth embodiment of the present invention. The method of the twelfth embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the twelfth embodiment are detailed as follows.

Firstly, step 1201 is executed to enable the Bluetooth service estimation apparatus to detect at least one data packet transmitted between the Bluetooth host and a remote Bluetooth device. Step 1202 is executed to enable the Bluetooth service estimation apparatus, which is in a Bluetooth sniff mode, to determine that a sniff interval of the remote Bluetooth device matches an HID sniff interval according to contents of the at least one data packet transmitted from the remote Bluetooth device to the Bluetooth host. Then, step 1203 is executed to enable the Bluetooth service estimation apparatus to determine that the Bluetooth service type is an HID service. Finally, step 1204 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

Figure 13:
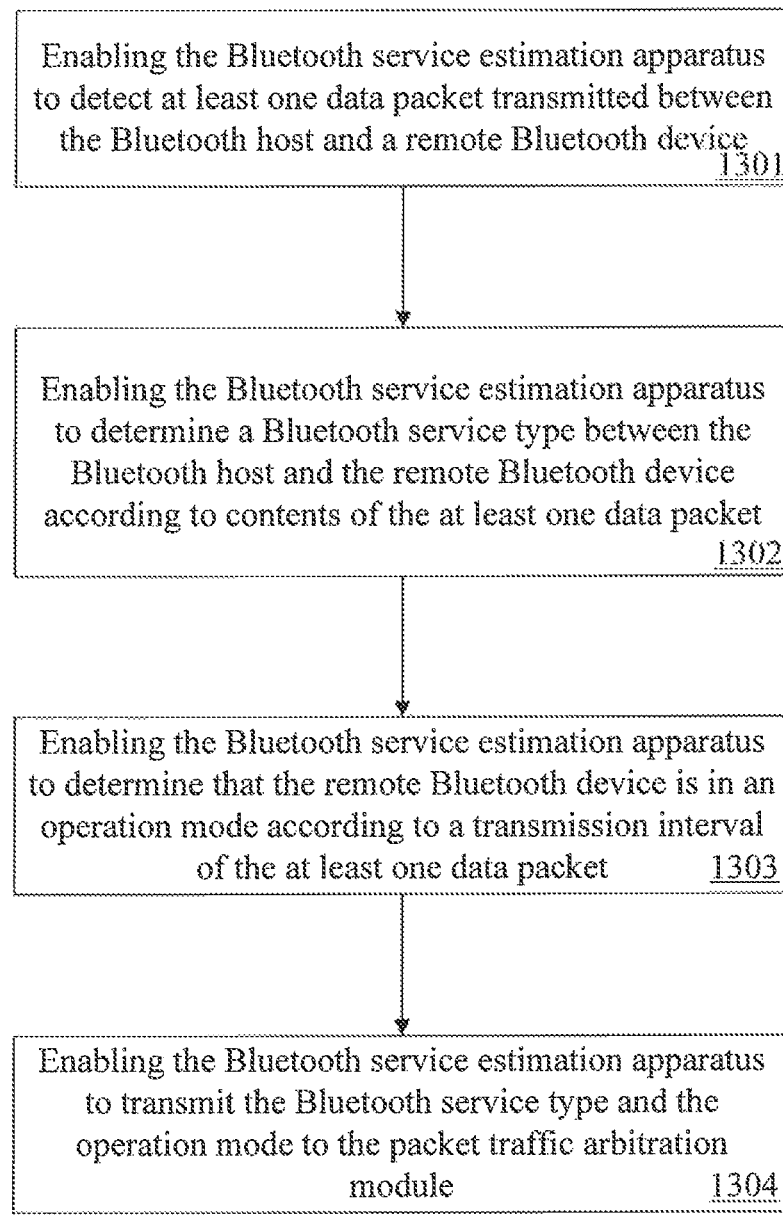
FIG. 13 is a flowchart diagram of a Bluetooth service estimation method according to a thirteenth embodiment of the present invention.

Referring next to FIG. 13, there is shown a flowchart diagram of a Bluetooth service estimation method according to a thirteenth embodiment of the present invention. The method of the thirteenth embodiment is also for use in a Bluetooth service estimation apparatus (e.g., the Bluetooth service estimation apparatuses of the aforesaid embodiments). The Bluetooth service estimation apparatus is electrically connected with a packet traffic arbitration module of a Wi-Fi host and a Bluetooth host. Steps of the Bluetooth service estimation method of the thirteenth embodiment are detailed as follows.

Firstly, step 1301 is executed to enable the Bluetooth service estimation apparatus to detect at least one data packet transmitted between the Bluetooth host and a remote Bluetooth device. Then, step 1302 is executed to enable the Bluetooth service estimation apparatus to determine a Bluetooth service type between the Bluetooth host and the remote Bluetooth device according to contents of the at least one data packet. Step 1303 is executed to enable the Bluetooth service estimation apparatus to determine that the remote Bluetooth device is in an operation mode according to a transmission interval of the at least one data packet transmitted from the remote Bluetooth device to the Bluetooth host. The operation mode is one of an idle mode and an active mode. Finally, step 1304 is executed to enable the Bluetooth service estimation apparatus to transmit the Bluetooth service type to the packet traffic arbitration module so that the packet traffic arbitration module determines a weight of network resources according to the Bluetooth service type and decides a utilization rate of an antenna according to the weight of the network resources.

According to the above descriptions, the Bluetooth service estimation apparatus and the Bluetooth service estimation method of the present invention can analyze behaviors and contents of a general data packet to determine the Bluetooth service type so that the packet traffic arbitration module and the Wi-Fi host perform subsequent operations and determinations. In other words, the Bluetooth service estimation apparatus and the Bluetooth service estimation method of the present invention can eliminate the need of defining an additional control instruction, which makes use of the electronic device that adopts the Bluetooth protocol much more flexible.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A Bluetooth service estimation method for a Bluetooth service estimation apparatus, the Bluetooth service estimation apparatus being disposed in a Bluetooth controller, and electrically connected with a Wi-Fi host and a Bluetooth host, the Bluetooth service estimation method comprising the following steps:
   (a) detecting, by the Bluetooth service estimation apparatus, a plurality of data packets transmitted between the Bluetooth host and a remote Bluetooth device, wherein the plurality of data packets comprises a service packet transmitted from the remote Bluetooth device to the Bluetooth host;
   (b) determining, by the Bluetooth service estimation apparatus, a Bluetooth service type between the Bluetooth host and the remote Bluetooth device according to contents of the plurality of data packets; and
   (c) transmitting, by the Bluetooth service estimation apparatus, the Bluetooth service type to the Wi-Fi host so that the Wi-Fi host determines a weight of network resources according to the Bluetooth service type and decides a utilization rate of an antenna according to the weight of the network resources;
wherein step (b) comprises:
   (i) determining, by the Bluetooth service estimation apparatus, whether the service packet transmitted between the Bluetooth host and the remote Bluetooth device is an asynchronous connectionless (ACL) packet according to a data type bit of the service packet;
   (ii) determining, by the Bluetooth service estimation apparatus, that the Bluetooth service type is an ACL service if the service packet transmitted between the Bluetooth host and the remote Bluetooth device is the ACL packet;
   (iii) accumulating, by the Bluetooth service estimation apparatus, a plurality of ACL data packets transmitted between the Bluetooth host and the remote Bluetooth device if the service estimator determines that the Bluetooth service type is the ACL service;
   (iv) determining, by the Bluetooth service estimation apparatus, that a total data amount of the plurality of ACL data packets exceeds a data threshold value within a fixed time period; and
   (v) determining, by the Bluetooth service estimation apparatus, that the ACL service is one of a Personal Area Network (PAN) service, a File Transfer Profile (FTP) service and an Object Push Profile (OPP) service if the total data amount of the plurality of ACL data packets exceeds the data threshold value within the fixed time period.

2. The Bluetooth service estimation method as claimed in claim 1, wherein the plurality of data packets further comprise a connection response packet transmitted from the remote Bluetooth device to the Bluetooth host.

3. The Bluetooth service estimation method as claimed in claim 2, wherein the connection response packet is a Frequency Hopping Synchronization (FHS) packet, and step (b) further comprises:
   (b1) determining, by the Bluetooth service estimation apparatus, that the remote Bluetooth device is one of a computer device, a mobile phone device, an audio device and a human interface device (HID) according to a Class of Device (COD) field of the FHS packet.

4. The Bluetooth service estimation method as claimed in claim 3, wherein step (b1) further comprises:
   (b11) determining, by the Bluetooth service estimation apparatus, that the Bluetooth service type is an HID service if the remote Bluetooth device is determined to be the HID according to the COD field of the FHS packet.

5. The Bluetooth service estimation method as claimed in claim 3, wherein step (b1) further comprises:
   (b12) determining, by the Bluetooth service estimation apparatus, that the Bluetooth service type is an audio device service if the remote Bluetooth device is determined to be the audio device according to the COD field of the FHS packet.

6. The Bluetooth service estimation method as claimed in claim 1, wherein step (b) further comprises:
   (b1) determining, by the Bluetooth service estimation apparatus, whether the service packet has an auto-flushable flag bit; and
   (b2) determining, by the Bluetooth service estimation apparatus, that the Bluetooth service type is an advanced audio distribution profile (A2DP) service if the service packet transmitted between the Bluetooth host and the remote Bluetooth device is the ACL packet, and the service packet has the auto-flushable flag bit.

7. The Bluetooth service estimation method as claimed in claim 1, wherein step (b) further comprises:
   (b1) determining, by the Bluetooth service estimation apparatus, whether the service packet comprises a Sync Word byte; and
   (b2) determining, by the Bluetooth service estimation apparatus, that the Bluetooth service type is an advanced audio distribution profile (A2DP) service if the service packet comprises the Sync Word byte.

8. The Bluetooth service estimation method as claimed in claim 1, wherein the service packet is determined, by the Bluetooth service estimation apparatus, to be a Link Manager Protocol (LMP) packet, and step (b) further comprises:
   (b1) determining, by the Bluetooth service estimation apparatus, whether a Synchronous Connection Oriented (SCO) connection is established between the Bluetooth host and the remote Bluetooth device according to an SCO acceptance message of the LMP packet; and
   (b2) determining, by the Bluetooth service estimation apparatus, that the Bluetooth service type is an SCO service if the SCO connection is established between the Bluetooth host and the remote Bluetooth device.

9. The Bluetooth service estimation method as claimed in claim 1, wherein step (b) comprises:
   (b1) determining, by the Bluetooth service estimation apparatus, which is in a Bluetooth sniff mode, whether a sniff interval of the remote Bluetooth device matches a sniff interval of an HID according to the contents of the plurality of data packets transmitted from the remote Bluetooth device to the Bluetooth host; and
   (b2) determining, by the Bluetooth service estimation apparatus, that the Bluetooth service type is a HID service if the sniff interval of the remote Bluetooth device matches the sniff interval of the HID.

10. The Bluetooth service estimation method as claimed in claim 1, further comprising the following step after step (b):
   (b1) determining, by the Bluetooth service estimation apparatus, an operation mode of the remote Bluetooth device according to a transmission interval of the plurality of data packets transmitted between the remote Bluetooth device and the Bluetooth host, wherein the operation mode is one of an idle mode and an active mode.

11. The Bluetooth service estimation method as claimed in claim 10, wherein step (c) further comprises:
   (c1) transmitting, by the Bluetooth service estimation apparatus, the operation mode in addition to the Bluetooth service type to the Wi-Fi host so that the Wi-Fi host determines the weight of the network resources according to the operation mode in addition to the Bluetooth service type.

12. A Bluetooth service estimation apparatus, being disposed in a Bluetooth controller and electrically connected with a packet traffic arbitration module of a Wi-Fi host and a Bluetooth host, the Bluetooth service estimation apparatus comprising:
   a transceiver, being configured to receive a plurality of data packets transmitted between the Bluetooth host and a remote Bluetooth device, wherein the plurality of data packets comprise a service packet; and
   a service estimation module, connected to the transceiver electrically and being configured to determine a Bluetooth service type between the Bluetooth host and the remote Bluetooth device according to contents of the plurality of data-packets;
   wherein the transceiver is further configured to transmit the Bluetooth service type to the packet traffic arbitration module so that the packet traffic arbitration module determines a weight of network resources according to the Bluetooth service type and decides a utilization rate of an antenna according to the weight of the network resources;
   wherein the service estimation module further comprises:
   a packet analyzer, configured to determine whether the service packet transmitted between the Bluetooth host and the remote Bluetooth device is an ACL packet according to a data type bit of the service packet;
   a service estimator, configured to determine that the Bluetooth service type is an ACL service if the packet analyzer determines that the service packet transmitted between the Bluetooth host and the remote Bluetooth device is the ACL packet; and
   an accumulator, configured to accumulate a plurality of ACL data packets transmitted between the Bluetooth host and the remote Bluetooth device if the service estimator determines that the Bluetooth service type is an ACL service, and to determine that a total data amount of the plurality of ACL data packets exceeds a data threshold value within a fixed time period;
   wherein the service estimator is further configured to determine that the ACL service is one of a Personal Area Network (PAN) service, a File Transfer Profile (FTP) service and an Object Push Profile (OPP) service if the accumulator determines that the total data amount of the plurality of ACL data packets exceeds the data threshold value within the fixed time period.

13. The Bluetooth service estimation apparatus as claimed in claim 12, wherein the transceiver is further configured to receive the plurality of data packets transmitted from the remote Bluetooth device to the Bluetooth host, the plurality of data packets further comprise a Frequency Hopping Synchronization (FHS) packet, and the packet analyzer is further configured to determine that the remote Bluetooth device is one of a computer device, a mobile phone device, an audio device and a human interface device (HID) according to a Class of Device (COD) field of the FHS packet.

14. The Bluetooth service estimation apparatus as claimed in claim 13, wherein the service estimator is configured to determine that the Bluetooth service type is an HID service if the packet analyzer determines that the remote Bluetooth device is the HID according to the COD field of the FHS packet.

15. The Bluetooth service estimation apparatus as claimed in claim 14, wherein the service estimation module further comprises:
   a data interval analyzer, being configured to determine an operation mode of the remote Bluetooth device according to a transmission interval of the plurality of data packets transmitted from the remote Bluetooth device to the Bluetooth host, wherein the operation mode is one of an idle mode and an active mode;
   wherein the transceiver is further configured to transmit the operation mode in addition to the Bluetooth service type to the packet traffic arbitration module so that the packet traffic arbitration module of the Wi-Fi host determines the weight of the network resources according to the operation mode in addition to the Bluetooth service type.

16. The Bluetooth service estimation apparatus as claimed in claim 13, wherein the service estimator is configured to determine that the Bluetooth service type is an audio device service if the packet analyzer determines that the remote Bluetooth device is the audio device according to the COD field of the FHS packet.

17. The Bluetooth service estimation apparatus as claimed in claim 12, wherein the packet analyzer is further configured to determine whether the service packet has an auto-flushable flag bit, and the service estimator is further configured to determine that the Bluetooth service type is an advanced audio distribution profile (A2DP) service if the packet analyzer determines that the service packet transmitted between the Bluetooth host and the remote Bluetooth device is the ACL packet, and the service packet has the auto-flushable flag bit.

18. The Bluetooth service estimation apparatus as claimed in claim 12, wherein the packet analyzer is further configured to determine whether the service packet comprises a Sync Word byte, and the service estimator is further configured to determine that the Bluetooth service type is a compressed advanced audio distribution profile (A2DP) service if the packet analyzer determines that the service packet comprises the Sync Word byte.

19. The Bluetooth service estimation apparatus as claimed in claim 12, wherein the service packet is determined to be a Link Manager Protocol (LMP) packet, the packet analyzer is further configured to determine whether a Synchronous Connection Oriented (SCO) connection is established between the Bluetooth host and the remote Bluetooth device according to an SCO acceptance message of the LMP packet, and the service estimator is further configured to determine that the Bluetooth service type is an SCO service if the packet analyzer determines that the SCO connection is established between the Bluetooth host and the remote Bluetooth device.

20. The Bluetooth service estimation apparatus as claimed in claim 12, wherein the service estimation module further comprises:
- a data interval analyzer, being configured to, in a Bluetooth sniff mode, determine whether a sniff interval of the remote Bluetooth device matches a sniff interval of a human interface device (HID) according to the contents of the plurality of data packets transmitted from the remote Bluetooth device to the Bluetooth host;
- wherein the service estimator is further configured to determine that the Bluetooth service type is an HID service if the data interval analyzer determines that the sniff interval of the remote Bluetooth device matches the sniff interval of the HID.

* * * * *